United States Patent
Chiba

(10) Patent No.: US 11,981,383 B2
(45) Date of Patent: May 14, 2024

(54) STRADDLE-TYPE SEAT

(71) Applicant: TS TECH CO., LTD., Asaka (JP)

(72) Inventor: Tomohisa Chiba, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 200 days.

(21) Appl. No.: 17/623,404

(22) PCT Filed: Jun. 25, 2020

(86) PCT No.: PCT/JP2020/025030
§ 371 (c)(1),
(2) Date: Dec. 28, 2021

(87) PCT Pub. No.: WO2020/262537
PCT Pub. Date: Dec. 30, 2020

(65) Prior Publication Data
US 2022/0371678 A1 Nov. 24, 2022

(30) Foreign Application Priority Data

Jun. 28, 2019 (JP) ................. 2019-121830

(51) Int. Cl.
*B62J 1/00* (2006.01)
*B62J 45/00* (2020.01)
*B62J 50/30* (2020.01)

(52) U.S. Cl.
CPC ............... *B62J 1/00* (2013.01); *B62J 45/00* (2020.02); *B62J 50/30* (2020.02)

(58) Field of Classification Search
CPC ............ B62J 1/00; B62J 45/00; B62J 50/30
See application file for complete search history.

(56) References Cited

U.S. PATENT DOCUMENTS

| | | |
|---|---|---|
| 2017/0144571 A1 | 5/2017 | Chiba |
| 2018/0281640 A1 | 10/2018 | Tsurumi et al. |
| 2019/0255978 A1 | 8/2019 | Chiba |
| 2020/0331374 A1 | 10/2020 | Chiba |
| 2021/0339667 A1 | 11/2021 | Chiba |

FOREIGN PATENT DOCUMENTS

| | | |
|---|---|---|
| JP | S52-080946 U | 6/1977 |
| JP | 3160847 B | 4/2001 |
| JP | 2008-094160 A | 4/2008 |
| JP | 2017-100703 A | 6/2017 |
| JP | 2018-167600 A | 11/2018 |

OTHER PUBLICATIONS

International Search Report and Written Opinion with English Translation issued in PCT/JP2020/025030, dated Aug. 18, 2020 (10 pages).

*Primary Examiner* — Anthony D Barfield
(74) *Attorney, Agent, or Firm* — Dority & Manning, P.A.

(57) ABSTRACT

Provided is a straddle-type seat in which an influence of vibrations or an external environment on an electrical component is suppressed without increasing the size of the seat. A straddle-type seat on which a seated occupant is to be seated in a straddling state includes a seat bottom plate including an accommodating recessed portion that is recessed downward, and electrical components and accommodated in the accommodating recessed portion. The electrical components and are fixed in the accommodating recessed portion via cushioning members.

10 Claims, 19 Drawing Sheets

STRADDLE-TYPE SEAT

CROSS REFERENCE TO RELATED APPLICATIONS

This application is the U.S. National Stage entry of International Application No. PCT/JP2020/025030 filed under the Patent Cooperation Treaty and having a filing date of Jun. 25, 2020, which claims priority to Japanese Patent Application No. 2019-121830 having a filing date of Jun. 28, 2019, both of which are incorporated herein by reference.

TECHNICAL FIELD

The present invention relates to a straddle-type seat, particularly to a straddle-type seat with a built-in electrical component.

BACKGROUND ART

Regarding a seat to be used for motorcycles, a technique has been known in which air cells are disposed in a plurality of recessed portions formed in a cushion material disposed on a seat bottom plate formed of a hard plate-shaped member, and the hardness can be changed according to traveling conditions (PATENT LITERATURE 1). In a seat device described in PATENT LITERATURE 1, the air cells are inflated and deflated by a valve unit and an air supply pump with built-in electronic circuit substrates.

In addition, PATENT LITERATURE 2 describes a passenger vehicle seat in which an air spring is provided in a lower portion of a seat cushion to improve a cushioning characteristic and to be capable of coping with various conditions during traveling, the weight of an occupant, and the like.

CITATION LIST

Patent Literature

PATENT LITERATURE 1: JP 2017-100703 A
PATENT LITERATURE 2: JP 3160847 B2

SUMMARY OF INVENTION

Technical Problem

As described in PATENT LITERATURE 1, when an electrical component with a built-in electronic circuit is installed in a straddle-type seat for a motorcycle, an engine vibration isolation measure or a preventive measure against dust or water from an external environment becomes an issue.

When an air spring is adopted as a vibration isolation measure of an electrical component in a straddle-type seat as described in PATENT LITERATURE 2, the size of the seat is increased or a sense of seating comfort is decreased, which is a problem.

The present invention is conceived in view of the above problems, and an object of the present invention is to provide a straddle-type seat in which an influence of vibrations or an external environment on an electrical component is suppressed without increasing the size of the seat.

Solution to Problem

In order to solve the above problems, according to an aspect of the present invention, there is provided a straddle-type seat on which a seated occupant is to be seated in a straddling state, the seat including: a seat bottom plate including an accommodating recessed portion that is recessed downward; and an electrical component accommodated in the accommodating recessed portion, and the electrical component is fixed in the accommodating recessed portion via a cushioning member.

In the straddle-type seat of the present invention configured as described above, since the electrical component is accommodated in the accommodating recessed portion, and is fixed to the accommodating recessed portion via the cushioning member, an influence of vibrations or an external environment on the electrical component is suppressed without increasing the size of the seat.

In the straddle-type seat, the electrical component may be attached onto an attachment bracket in the accommodating recessed portion, and the attachment bracket may include a base portion disposed parallel to a bottom surface of the accommodating recessed portion, and an erect portion that is erected upward with respect to the base portion.

In the above configuration, the electrical component is held in a stable posture by the attachment bracket including the base portion and the erect portion.

In the straddle-type seat, the accommodating recessed portion may include the bottom surface and a rear wall orthogonal to the bottom surface at a rear end of the bottom surface. The cushioning member may include a first cushioning member to be disposed between the bottom surface and the base portion, and a second cushioning member to be disposed between the rear wall and the erect portion.

In the above configuration, since the first cushioning member disposed between the bottom surface of the accommodating recessed portion and the base portion of the attachment bracket absorbs up to down vibrations, and the second cushioning member disposed between the rear wall of the accommodating recessed portion and the erect portion of the attachment bracket absorbs front to back vibrations, vibrations input to the electrical component are efficiently dampened.

In the straddle-type seat, the first cushioning member may be disposed at a corner in the base portion of the attachment bracket.

In the above configuration, since the first cushioning member is disposed at the corner in the base portion of the attachment bracket, up to down vibrations input to the electrical component are more efficiently dispersed and dampened.

In the straddle-type seat, the second cushioning member may be disposed to interpose the erect portion.

In the above configuration, since the second cushioning member is disposed to interpose the erect portion of the attachment bracket, front to back vibrations input to the electrical component are further efficiently dampened.

In the straddle-type seat, a back surface of the seat bottom plate may be provided with a plurality of mounting members that abut a vehicle body when the straddle-type seat is attached to the vehicle body. The attachment bracket, the first cushioning member, and the second cushioning member may be disposed inside the plurality of mounting members in a width direction of the straddle-type seat.

In the above configuration, since vibrations input from the vehicle body to the straddle-type seat via the mounting members are appropriately dampened, vibrations input to the electrical component are further dampened.

In the straddle-type seat, a hardness of the second cushioning member may be lower than a hardness of the mounting member.

In the above configuration, vibrations input to the electrical component are further dampened while good ride quality of the straddle-type seat is maintained by the mounting members.

The straddle-type seat may further include a cover member attached to an upper surface of the seat bottom plate, and the cover member may be disposed to cover an upper side of the electrical component.

In the above configuration, since the upper side of the electrical component is covered with the cover member, the electrical component is protected from a load from above caused by an occupant or the like.

In the straddle-type seat, the seat bottom plate may include a ventilation portion communicating with the accommodating recessed portion. The ventilation portion may be covered with the cover member from above, so that a ventilation path through which outside air is to be ventilated is formed.

In the above configuration, since the seat bottom plate and the cover member form the ventilation path communicating with the accommodating recessed portion in which the electrical component is accommodated, the direct intrusion of water or dust into the accommodating recessed portion is suppressed.

In the straddle-type seat, the ventilation portion of the seat bottom plate may include a plurality of first protruding portions protruding upward and extending in a width direction of the straddle-type seat, the cover member may include a plurality of second protruding portions protruding downward from a back surface of the cover member and extending in the width direction of the straddle-type seat, and the first protruding portions and the second protruding portions may be alternately disposed in a front to back direction of the straddle-type seat to form the ventilation path.

In the above configuration, since the ventilation path has a structure formed of the first protruding portions and the second protruding portions that are alternately disposed in the front to back direction, the intrusion of water or dust is even further suppressed.

Advantageous Effects of Invention

According to the straddle-type seat of the present invention, since the electrical component is accommodated in the accommodating recessed portion, and is fixed to the accommodating recessed portion via the cushioning member, an influence of vibrations or an external environment on the electrical component is suppressed without increasing the size of the seat.

In addition, according to the straddle-type seat of the present invention, the electrical component is held in a stable posture by the attachment bracket including the base portion and the erect portion.

In addition, according to the straddle-type seat of the present invention, since the first cushioning member disposed between the bottom surface of the accommodating recessed portion and the base portion of the attachment bracket absorbs up to down vibrations, and the second cushioning member disposed between the rear wall of the accommodating recessed portion and the erect portion of the attachment bracket absorbs front to back vibrations, vibrations input to the electrical component are efficiently dampened.

In addition, according to the straddle-type seat of the present invention, since the first cushioning member is disposed at the corner in the base portion of the attachment bracket, up to down vibrations input to the electrical component are more efficiently dispersed and dampened.

In addition, according to the straddle-type seat of the present invention, since the second cushioning member is disposed to interpose the erect portion of the attachment bracket, front to back vibrations input to the electrical component are further efficiently dampened.

In addition, according to the straddle-type seat of the present invention, since vibrations input from the vehicle body to the straddle-type seat via the mounting members are appropriately dampened, vibrations input to the electrical component are further dampened.

In addition, according to the straddle-type seat of the present invention, vibrations input to the electrical component are further dampened while good ride quality of the straddle-type seat is maintained by the mounting members.

In addition, according to the straddle-type seat of the present invention, since the upper side of the electrical component is covered with the cover member, the electrical component is protected from a load from above caused by an occupant or the like.

In addition, according to the straddle-type seat of the present invention, since the seat bottom plate and the cover member form the ventilation path communicating with the accommodating recessed portion in which the electrical component is accommodated, the direct intrusion of water or dust into the accommodating recessed portion is suppressed.

In addition, according to the straddle-type seat of the present invention, since the ventilation path has a structure formed of the first protruding portions and the second protruding portions that are alternately disposed in the front to back direction, the intrusion of water or dust is even further suppressed.

DESCRIPTION OF EMBODIMENTS

Hereafter, a motorcycle seat S will be described as a straddle-type seat according to an embodiment of the present invention (hereinafter, referred to as the present embodiment) with reference to FIGS. 1 to 21.

The motorcycle seat S is a saddle-type seat on which a seated occupant (occupant or driver) is to be seated in a straddling state. The motorcycle seat S is detachably provided in a motorcycle V, and in FIG. 2, the motorcycle seat S that is removed from the motorcycle V will be described.

Incidentally, an embodiment to be described below is merely one example provided to facilitate understanding of the present invention, and does not limit the present invention. Namely, the shapes, dimensions, dispositions, and the like of members to be described below can be changed or improved without departing from the concept of the present invention, and it goes without saying that the present invention includes equivalents thereof.

Figure 1:
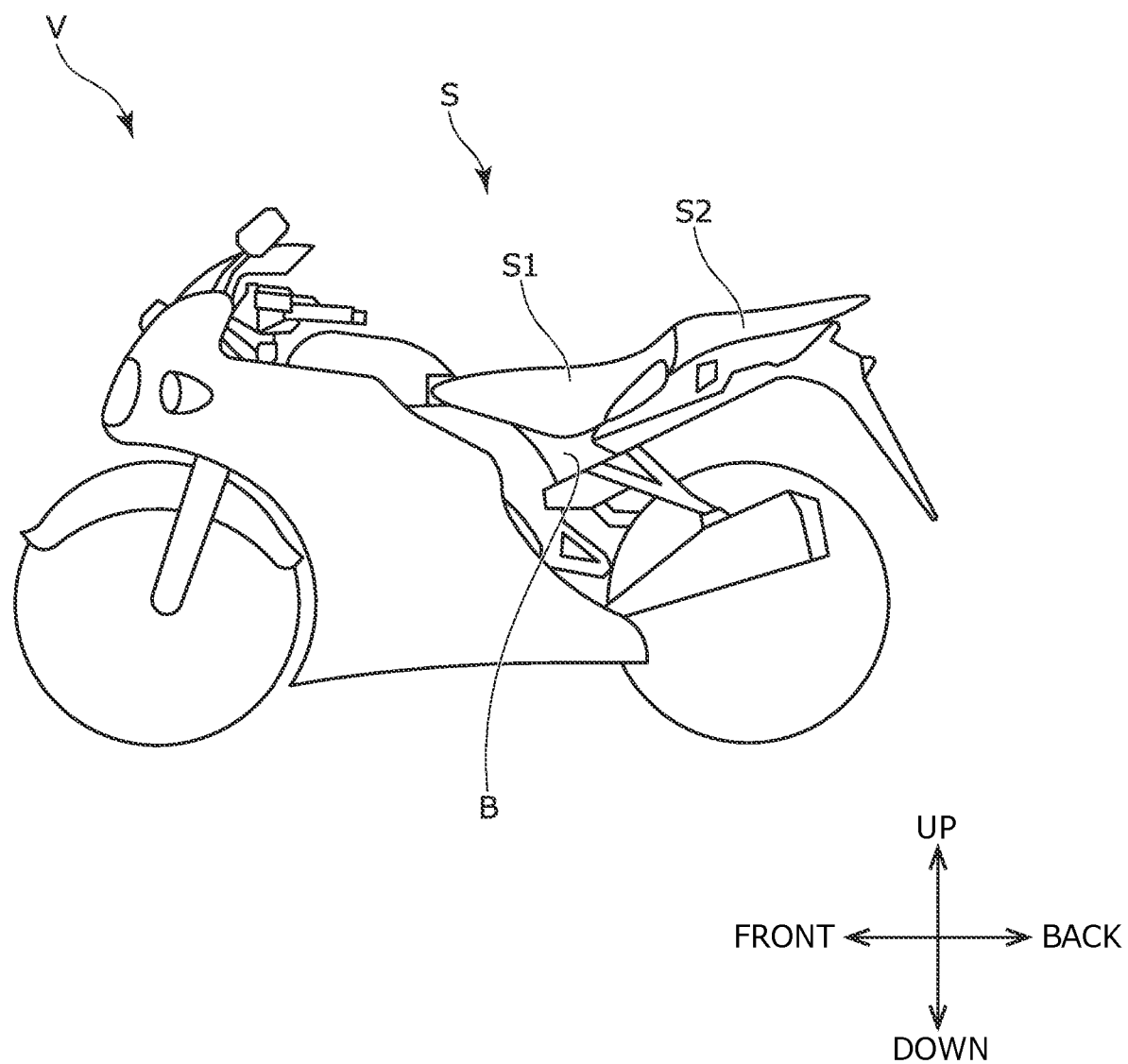
FIG. 1 is an external view of a motorcycle including a motorcycle seat according to one embodiment of the present invention.
Figure 2:
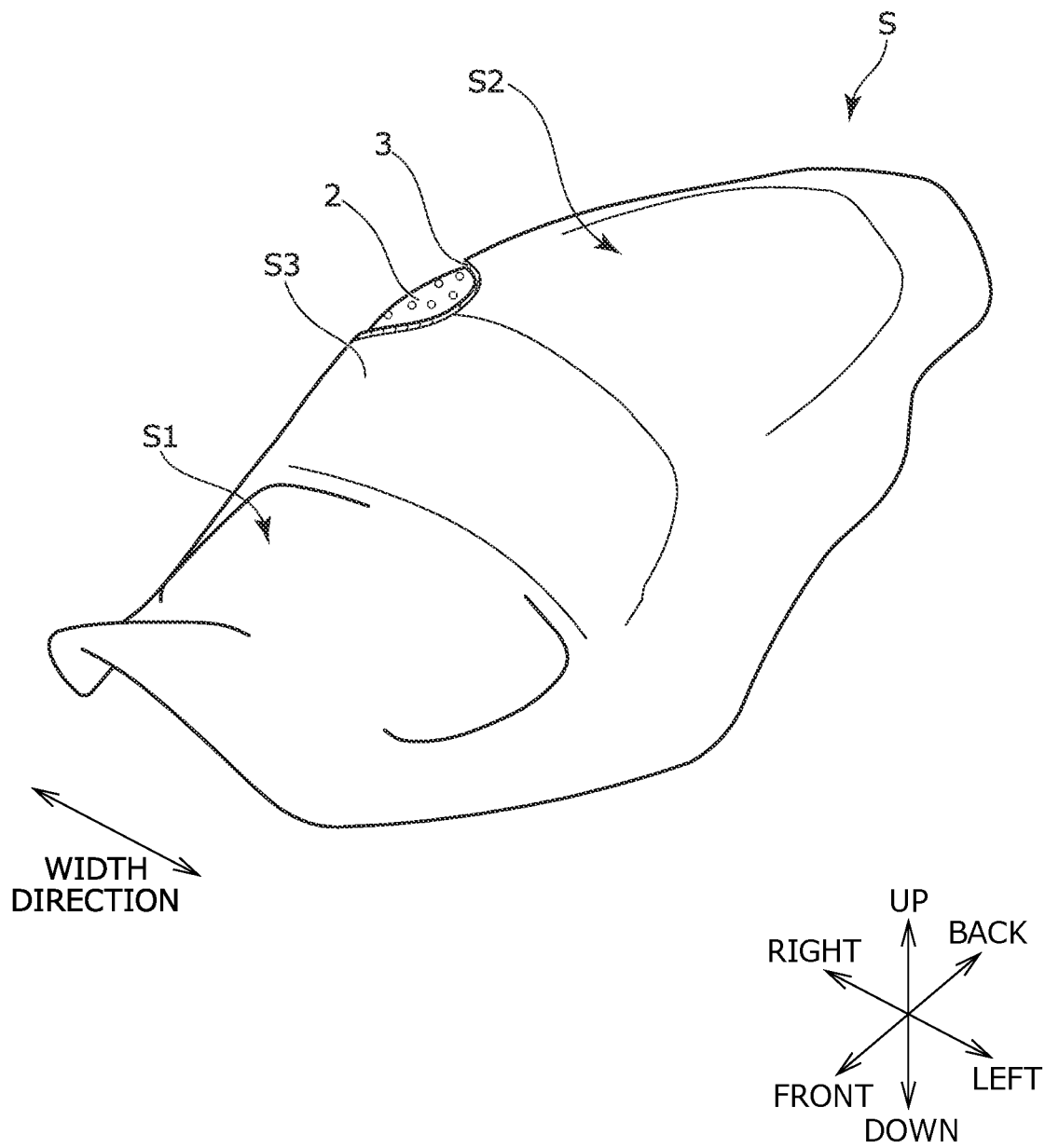
FIG. 2 is an external view of the motorcycle seat according to one embodiment of the present invention.

Regarding terms indicating directions in the specification, each direction is defined as in FIGS. 1 and 2. Specifically, in the following description, a "front to back direction" means a front to back direction when viewed from a seated occupant of the motorcycle seat S. A "seat width direction" is aligned with a right to left direction when viewed from the seated occupant of the motorcycle seat S. In addition, an "up to down direction" is aligned with an up to down direction when viewed from the seated occupant of the motorcycle seat S.

<Main Configuration of Motorcycle Seat 5>

As illustrated in FIG. 1, the motorcycle seat S according to the present embodiment (hereinafter, referred to as the motorcycle seat S) is installed in the motorcycle V in such a manner that the motorcycle seat S is attached to a vehicle body B (motorcycle main body). The motorcycle seat S is configured by placing a cushion material 2 on a seat bottom plate 1 to be described later and covering a surface of the cushion material 2 with a skin material 3. FIG. 2 is an external view of the motorcycle seat S, and for convenience of illustration, illustrates a state where the skin material 3 of a part of the motorcycle seat S is removed and the cushion material 2 is exposed.

The motorcycle seat S is a two-seater seat including a front seating portion 51 in the front and a rear seating portion S2 in the rear. The front seating portion 51 and the rear seating portion S2 are portions on which buttocks or thighs of an occupant (namely, seated occupant) of the motorcycle V are to be placed. In addition, a non-seating portion S3 on which the occupant is not to be seated is provided between the front seating portion S1 and the rear seating portion S2 in the motorcycle seat S.

(Seat Bottom Plate 1)

Figure 3:
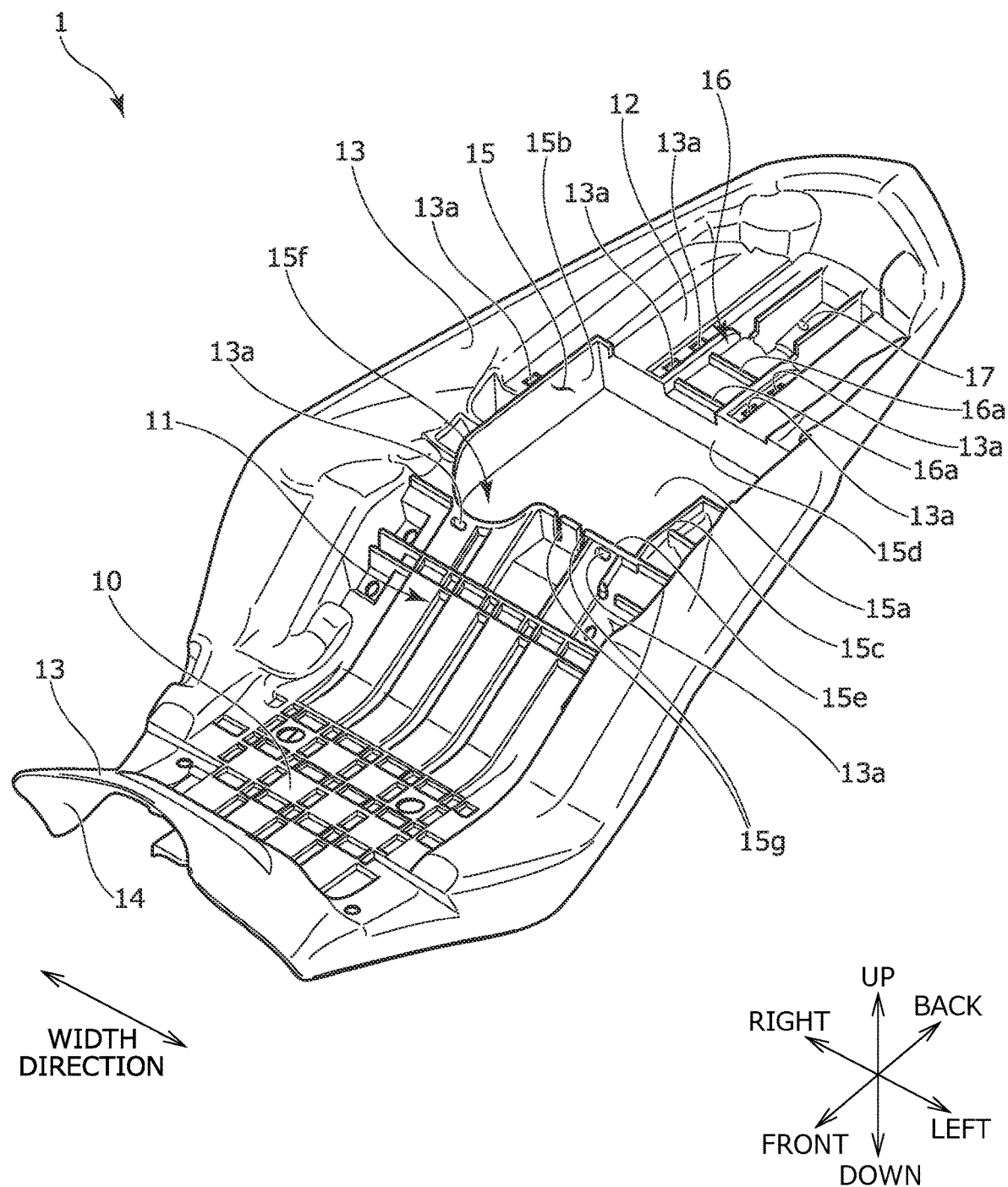
FIG. 3 is a perspective view of a seat bottom plate of the motorcycle seat according to one embodiment of the present invention.

A perspective view of the seat bottom plate 1 is illustrated in FIG. 3. The seat bottom plate 1 as a bottom plate forming a lower surface of the motorcycle seat S is made of a resin material, and includes a front portion 10 corresponding to the front seating portion S1, an inclined portion 11 corresponding to the non-seating portion S3, and a rear portion 12 corresponding to the rear seating portion S2 in order from the front.

As illustrated in FIG. 3, the seat bottom plate 1 includes a front surface 13 and a back surface 14, and the front surface 13 of the seat bottom plate 1 is provided with a plurality of engaging recessed portions 13a with which engaging protrusion portions 44 of a cover member 40 to be described later are to be fitted to and engage.

Figure 4:
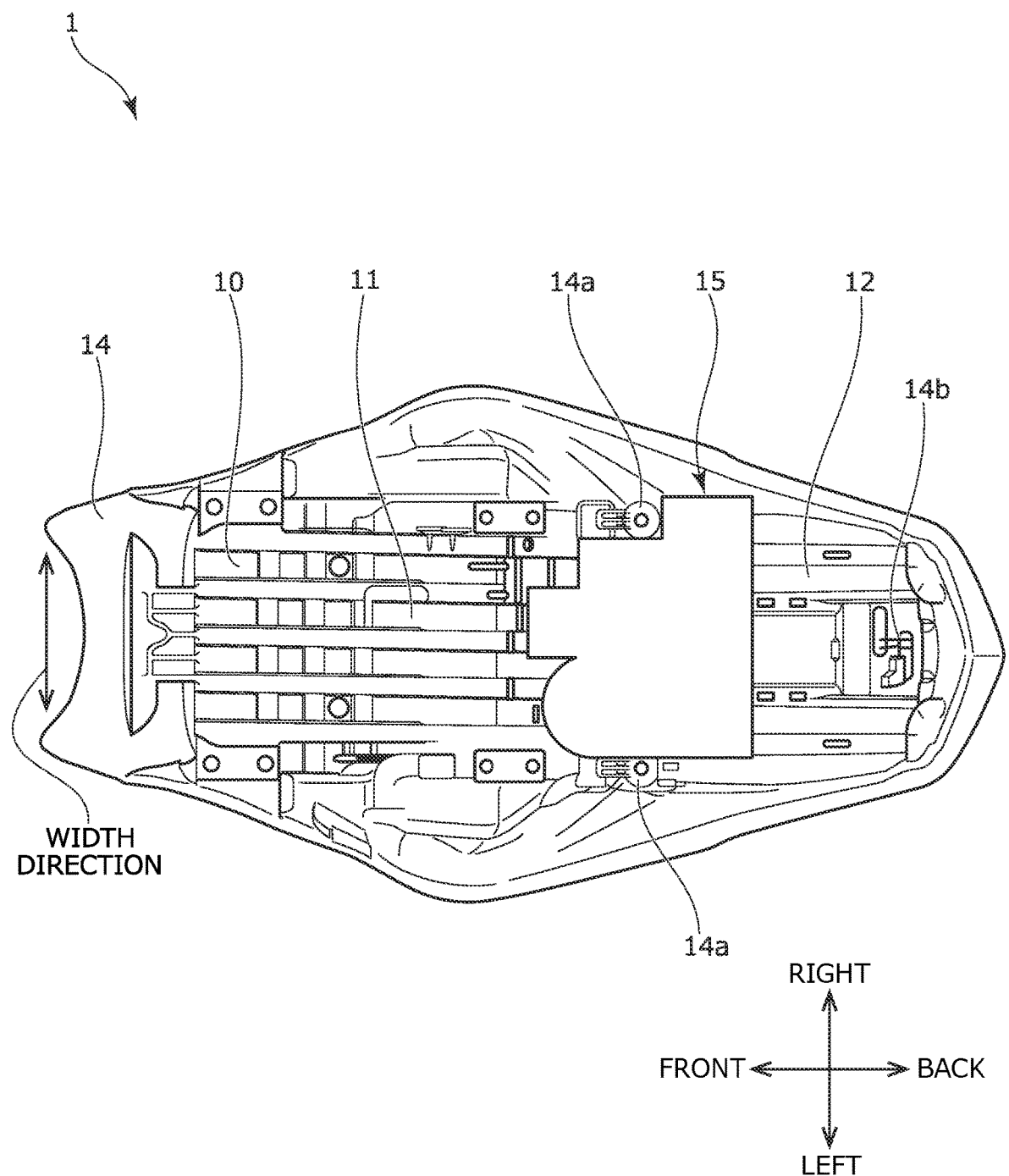
FIG. 4 is a back view of the seat bottom plate of the motorcycle seat according to one embodiment of the present invention.

As illustrated in FIG. 4, the back surface 14 of the seat bottom plate 1 is provided with a plurality of mounting members 14a that abut the vehicle body B when the motorcycle seat S is attached to the vehicle body B. In addition, the back surface 14 of the seat bottom plate 1 is provided with a striker 14b that allows the motorcycle seat S to be attached to the vehicle body B. The striker 14b can adopt a known structure for engagement with a striker engaging portion (not illustrated) provided on a vehicle body B side.

As illustrated in FIGS. 3 to 6, an accommodating recessed portion 15 that accommodates an electrical component (for example, an air supply pump 21 or a valve unit 22) included in a fluid supply device 20 to be described later is formed in the rear portion 12 of the seat bottom plate 1. The accommodating recessed portion 15 is a recessed portion that is recessed in a direction from the front surface 13 toward the back surface 14 of the seat bottom plate 1 (namely, downward).

As illustrated in FIG. 3, the accommodating recessed portion 15 includes a bottom surface 15a, and is a space surrounded and formed by a first side wall 15b and a second side wall 15c that are erected orthogonally to the bottom surface 15a in the seat width direction, a rear wall 15d that is erected orthogonally to the bottom surface 15a in the rear, and a front wall 15e that is erected orthogonally to the bottom surface 15a in the front.

Figure 5:
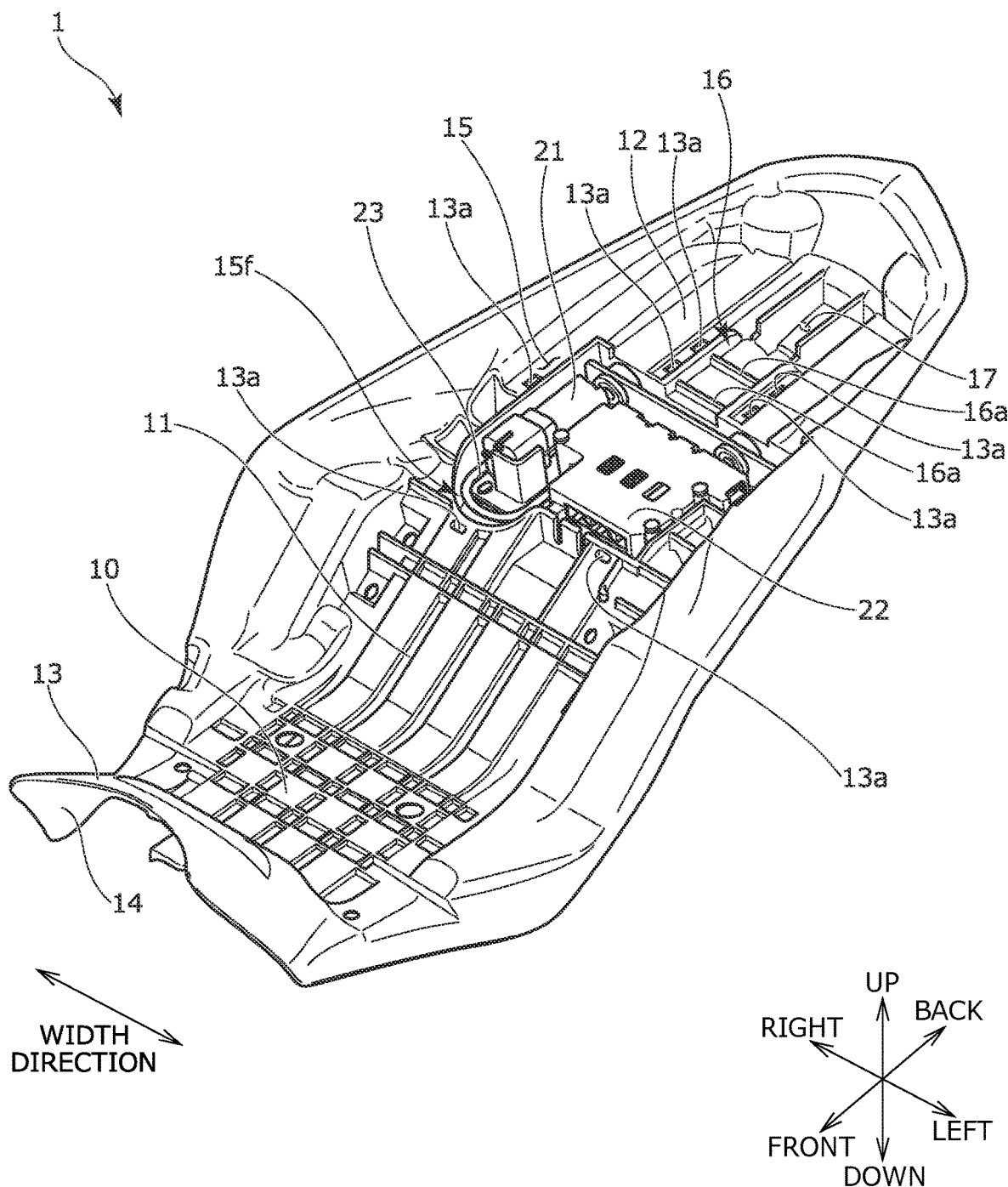
FIG. 5 is a perspective view illustrating a state where an air supply pump and a valve unit placed on an attachment bracket are disposed in an accommodating recessed portion of the seat bottom plate of the motorcycle seat according to one embodiment of the present invention.

As illustrated in FIG. 3, a protruding portion 15f which is curved such that a portion of the front wall 15e close to the first side wall 15b on a right side in the seat width direction protrudes forward is formed in the front wall 15e. As illustrated in FIG. 5, the protruding portion 15f corresponds to the curved shape of a connection pipe 23 to be described later.

Figure 6:
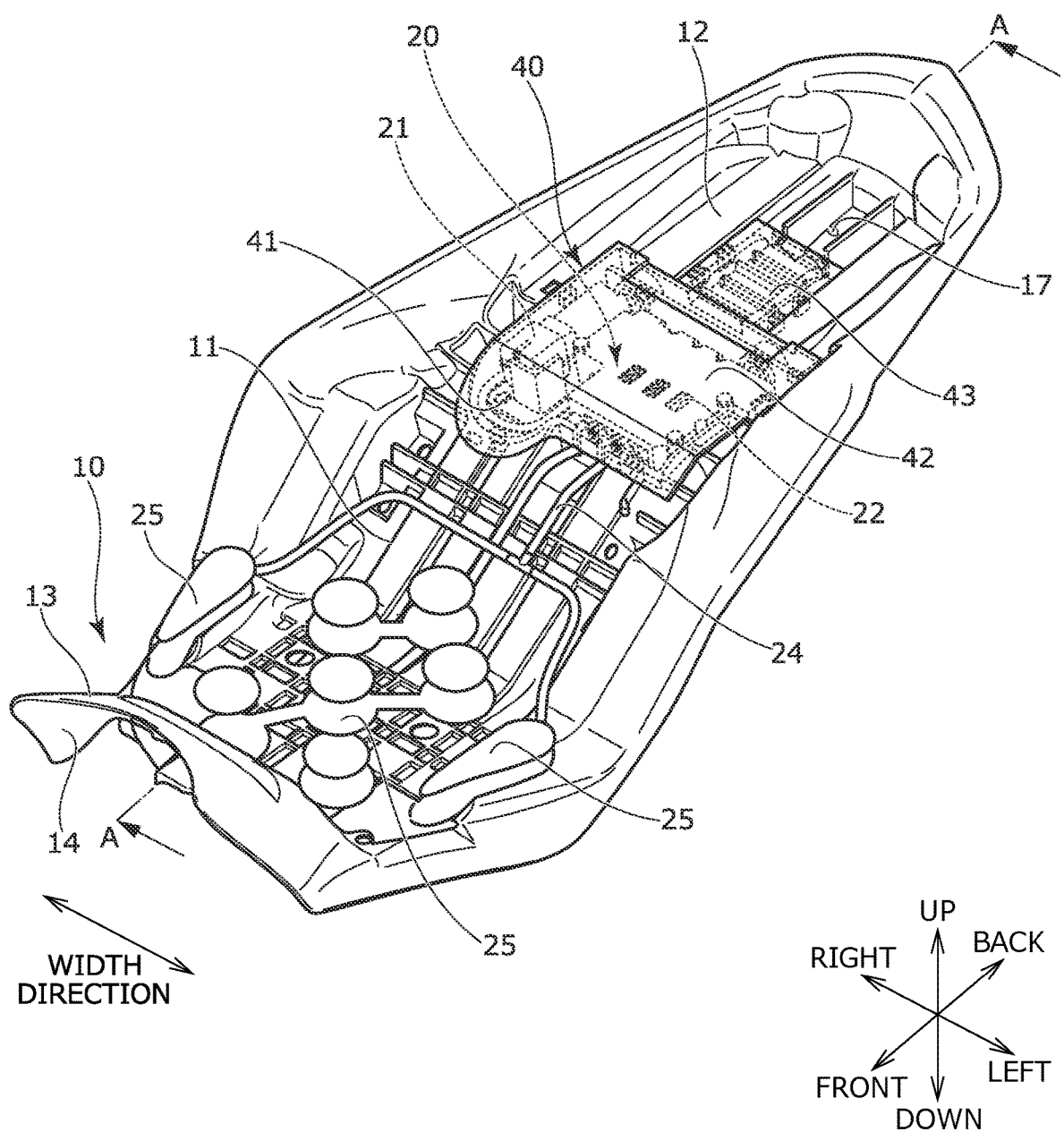
FIG. 6 is a perspective view illustrating a state where a cushion pad and a skin material are removed from the motorcycle seat according to one embodiment of the present invention.

In addition, as illustrated in FIG. 3, two cutouts 15g are formed in the front wall 15e at positions close to the second side wall 15c on a left side in the seat width direction. As illustrated in FIG. 6, the two cutouts 15g are formed to correspond to positions through which fluid supply tubes 24 to be described later pass.

In addition, the seat bottom plate 1 includes a passage portion 16 behind the accommodating recessed portion 15, the passage portion 16 communicating with the accommodating recessed portion 15. Further, a ventilation portion 17 that is a hole passing through the seat bottom plate 1 from the front surface 13 to the back surface 14 is provided on a rear side of the passage portion 16 of the seat bottom plate 1. As illustrated in FIG. 5, the passage portion 16 includes a plurality of first protruding portions 16a protruding upward and extending in the seat width direction.

Figure 7:
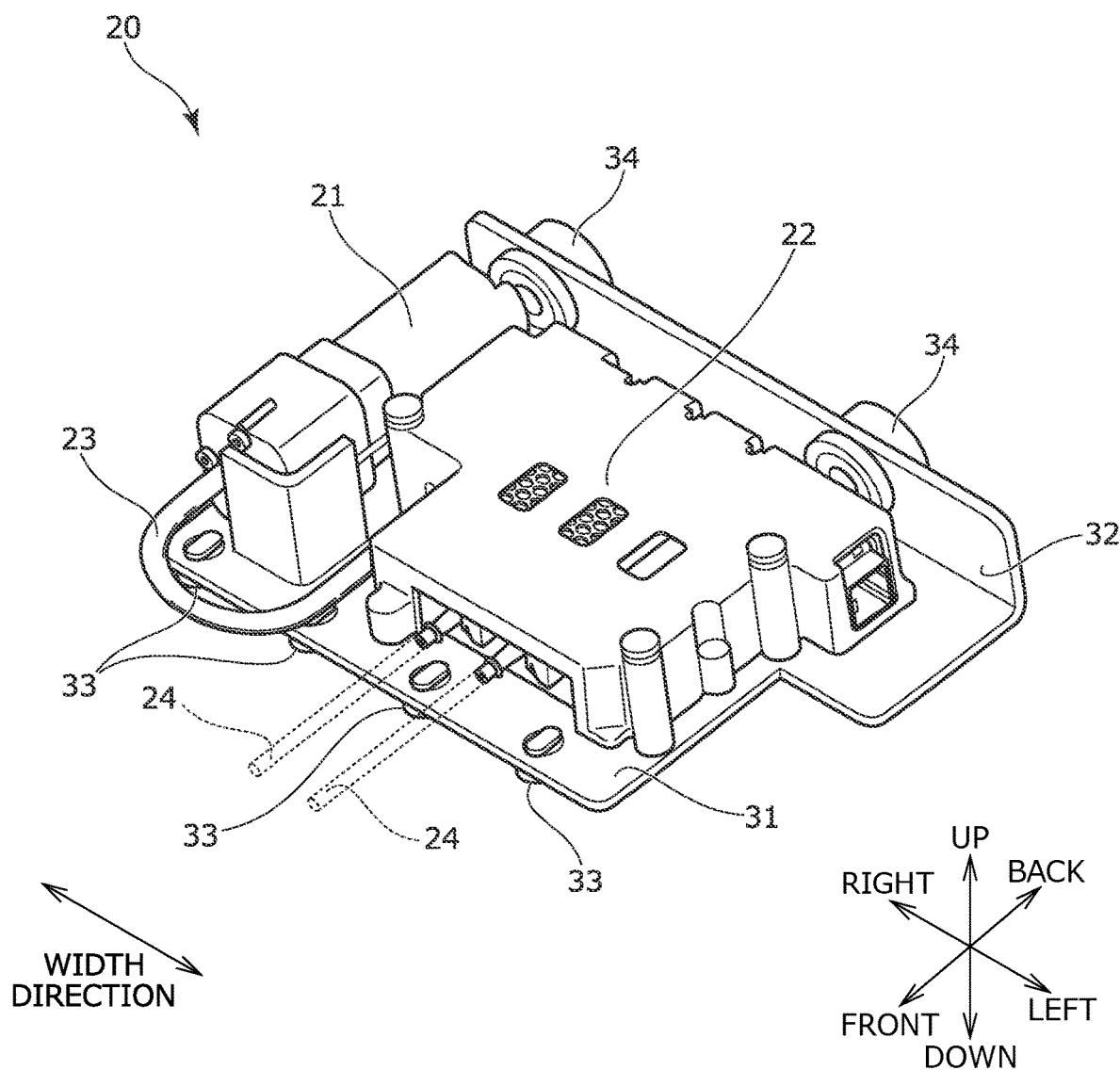
FIG. 7 is a perspective view illustrating a state where the air supply pump, the valve unit, and cushioning members are attached to the attachment bracket provided in the motorcycle seat according to one embodiment of the present invention.

As illustrated in FIGS. 6 and 7, the motorcycle seat S includes the fluid supply device 20 thereinside, the fluid supply device 20 adjusting a hardness of the front seating portion S1. The fluid supply device 20 includes the air supply pump 21 (compressed air generation device) that generates compressed air, the valve unit 22 (switching device) that operates to switch a supply line of the compressed air generated by the air supply pump 21, and the connection pipe 23 that connects the air supply pump 21 and the valve unit 22, as main components (FIG. 7).

The valve unit 22 is provided with a plurality of discharge ports of the compressed air. In addition, an electromagnetic valve (not illustrated) is provided inside the valve unit 22. Then, the valve unit 22 operates to switch the electromagnetic valve on and off, thereby switching the discharge port through which the compressed air is actually discharged, among the plurality of discharge ports.

In addition, as illustrated in FIGS. 6 and 7, the fluid supply tube 24 is connected to each of the discharge ports of the valve unit 22. The fluid supply tube 24 forms a compressed air supply path from the valve unit 22 to an air cell 25. When the discharge port from which the compressed air is discharged in the valve unit 22 is switched, the air cell 25 to which the compressed air is sent is switched.

The air cell 25 is a bag used to adjust a hardness of the front seating portion S1, and bulges when the air cell 25 is filled with the compressed air as a fluid to be supplied from the air supply pump 21 and the valve unit 22.

As described above, in the motorcycle seat S, the air cells 25 are disposed in the front seating portion S1 (occupant seating portion), and electrical components are disposed at rear positions avoiding the front seating portion S1 that is a main seating portion.

(Attachment Bracket 30)

As illustrated in FIGS. 5 to 8, the air supply pump 21 and the valve unit 22 that are electrical components built into the motorcycle seat S are attached onto the attachment bracket 30, and are fixed to the accommodating recessed portion 15 of the seat bottom plate 1 via first cushioning members 33 and second cushioning members 34 as cushioning members.

Figure 8:
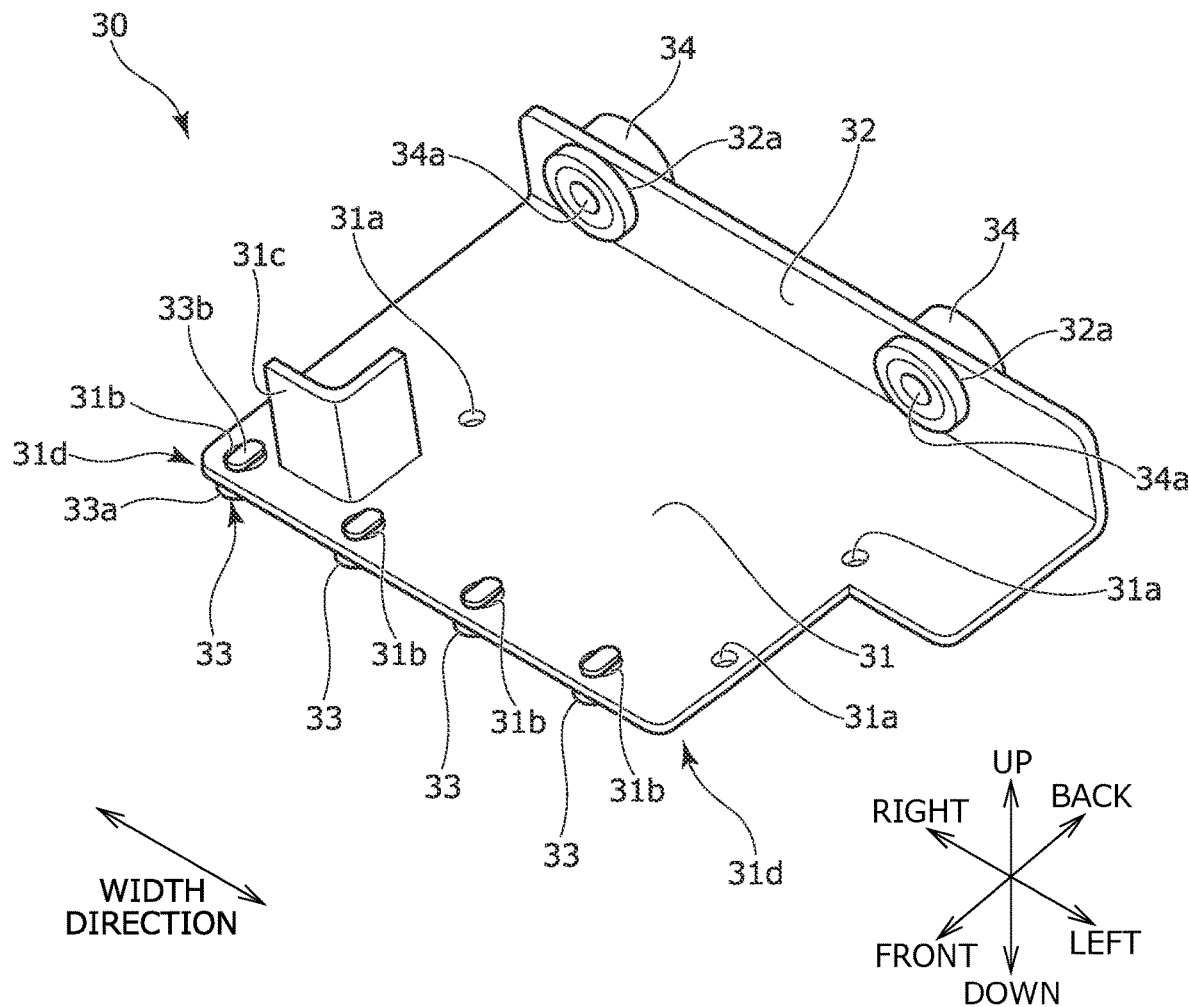
FIG. 8 is a perspective view illustrating a state where the cushioning members are attached to the attachment bracket provided in the motorcycle seat according to one embodiment of the present invention.

As illustrated in FIGS. 7 and 8, the attachment bracket 30 includes a base portion 31 to be disposed parallel to the bottom surface 15a of the accommodating recessed portion 15, and an erect portion 32 that is erected upward with respect to the base portion 31. The attachment bracket 30 has an L-shaped cross section in a plane orthogonal to the base portion 31 and to erect portion 32. It is preferable that the attachment bracket 30 is made of a resin material, but the attachment bracket 30 may be made of a metal or the like.

Fixing holes 31a for fixing the valve unit 22, first attachment holes 31b for attaching the first cushioning members 33, and a protective portion 31c that protects the front of the air supply pump 21 are formed in the base portion 31. The first cushioning member 33 is an elastic member made of rubber and including a leg portion 33a that abuts the bottom surface 15a of the accommodating recessed portion 15, and a protrusion portion 33b that protrudes upward from the leg portion 33a to engage with the first attachment holes 31b (FIG. 8).

Figure 9:
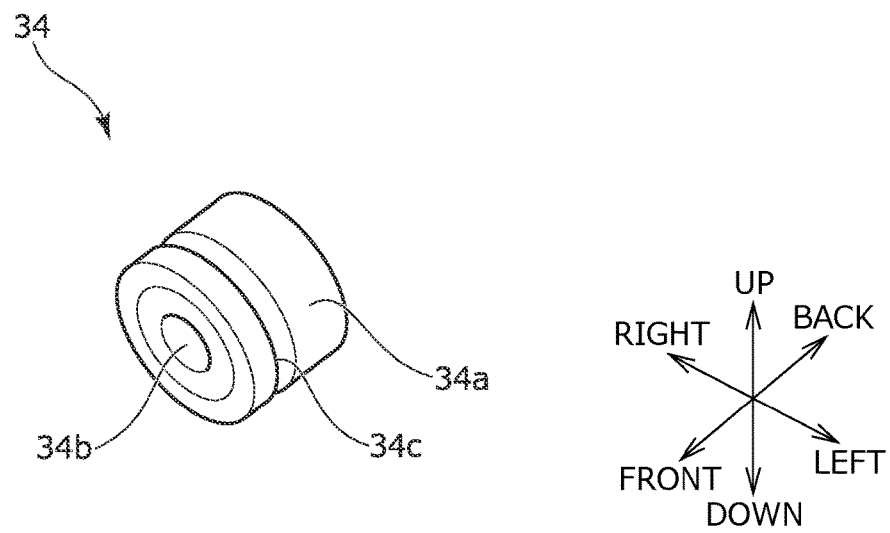
FIG. 9 is a perspective view of a second cushioning member to be attached to the attachment bracket provided in the motorcycle seat according to one embodiment of the present invention.
Figure 13:
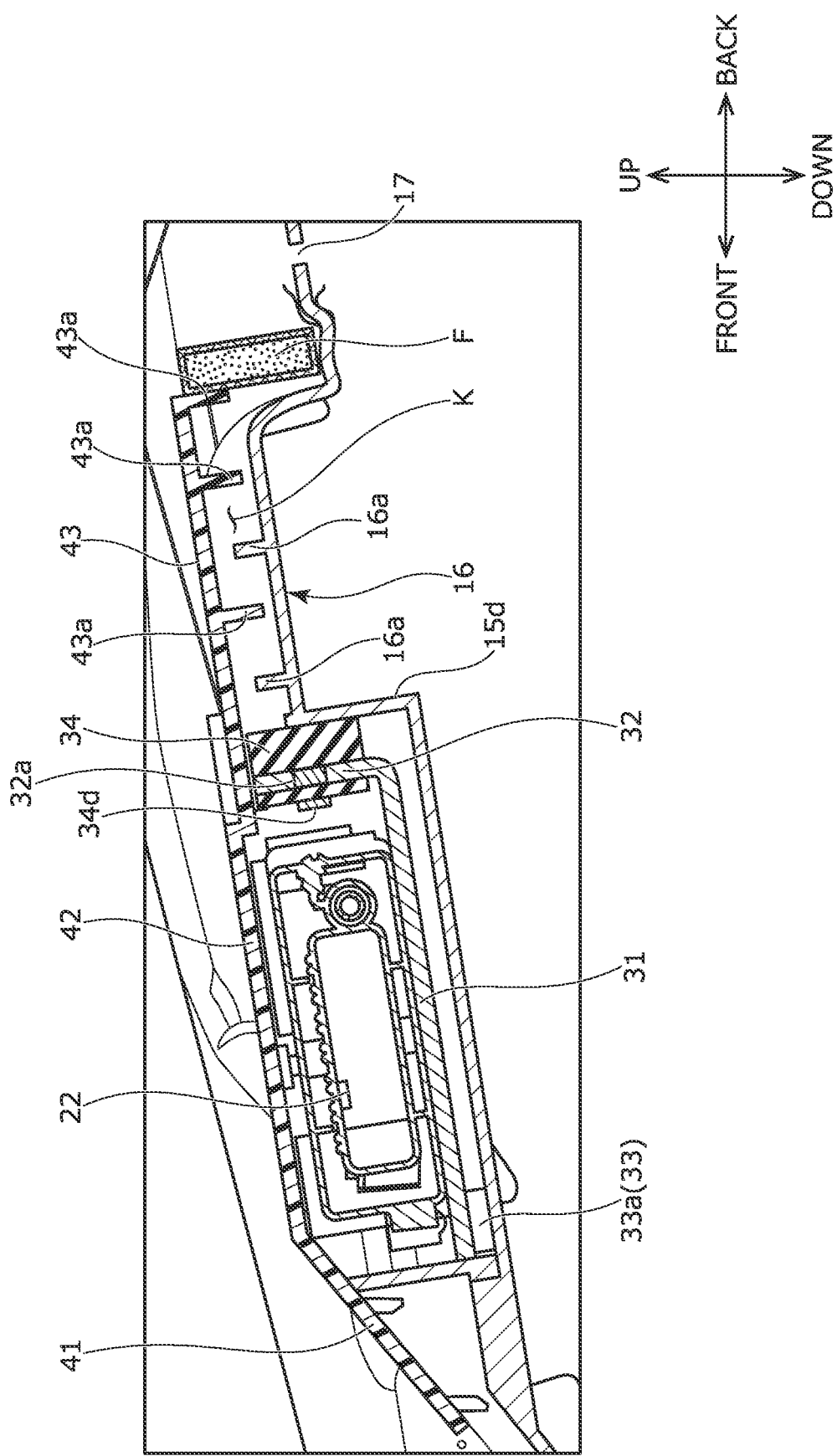
FIG. 13 is a cross-sectional view taken along line A-A in FIG. 6.

Second attachment holes 32a for attaching the second cushioning members 34 are formed in the erect portion 32. As illustrated in FIG. 9, the second cushioning member 34 is a grooved damper member (elastic member) made of rubber, in which a through hole 34b is formed at the center of a cylindrical main body 34a thereof and a groove portion 34c is formed in an outer periphery of the main body 34a. The groove portion 34c of the second cushioning member 34 is fitted to the second attachment hole 32a, so that the second cushioning member 34 is fixed to the erect portion 32. As illustrated in FIG. 13 to be described later, the second cushioning member 34 is interposed between a washer (not illustrated) and a bolt 34d to be attached to the erect portion 32.

(Cover Member 40)

Figure 10:
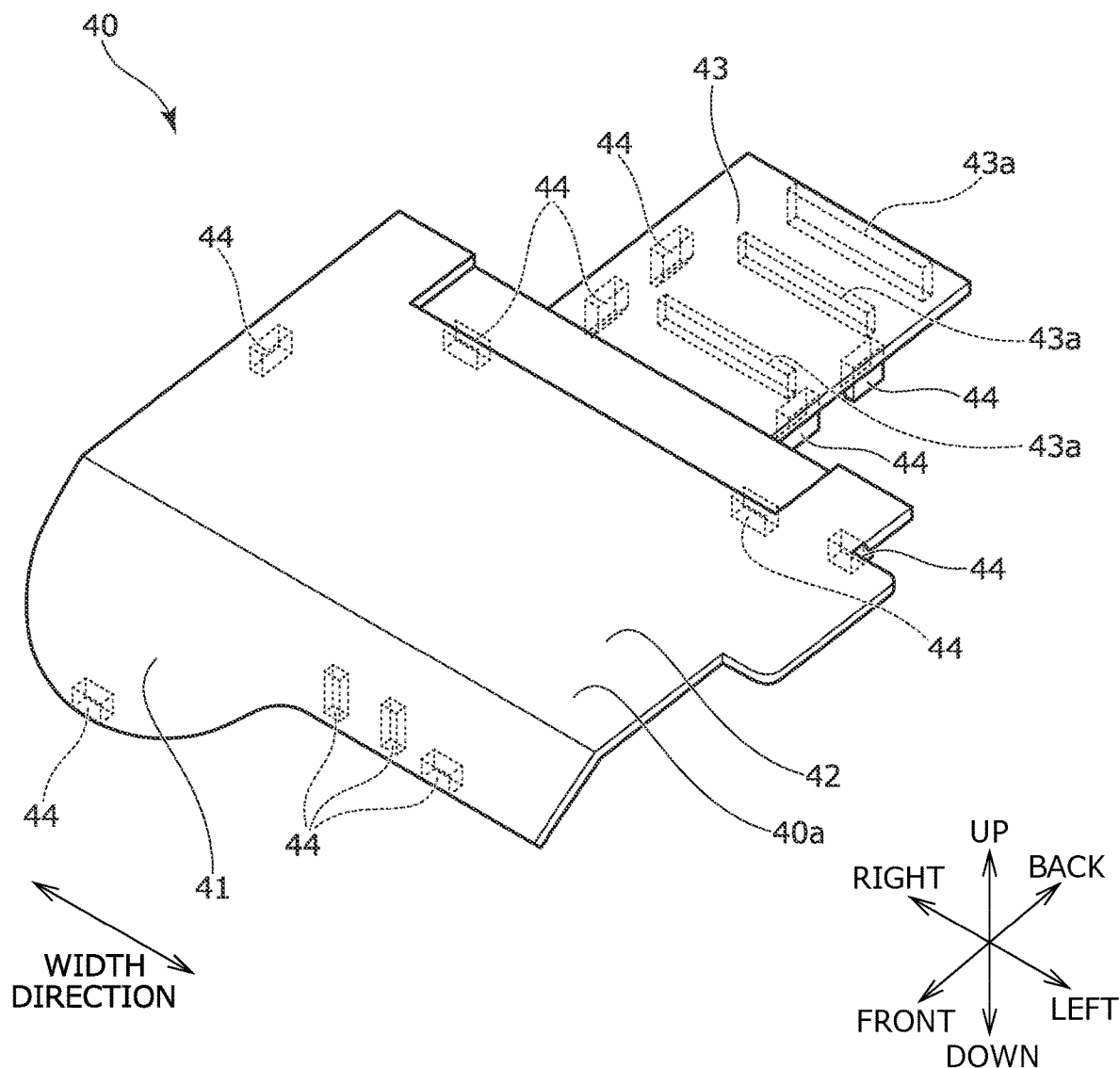
FIG. 10 is a perspective view of a cover member provided in the motorcycle seat according to one embodiment of the present invention.
Figure 11:
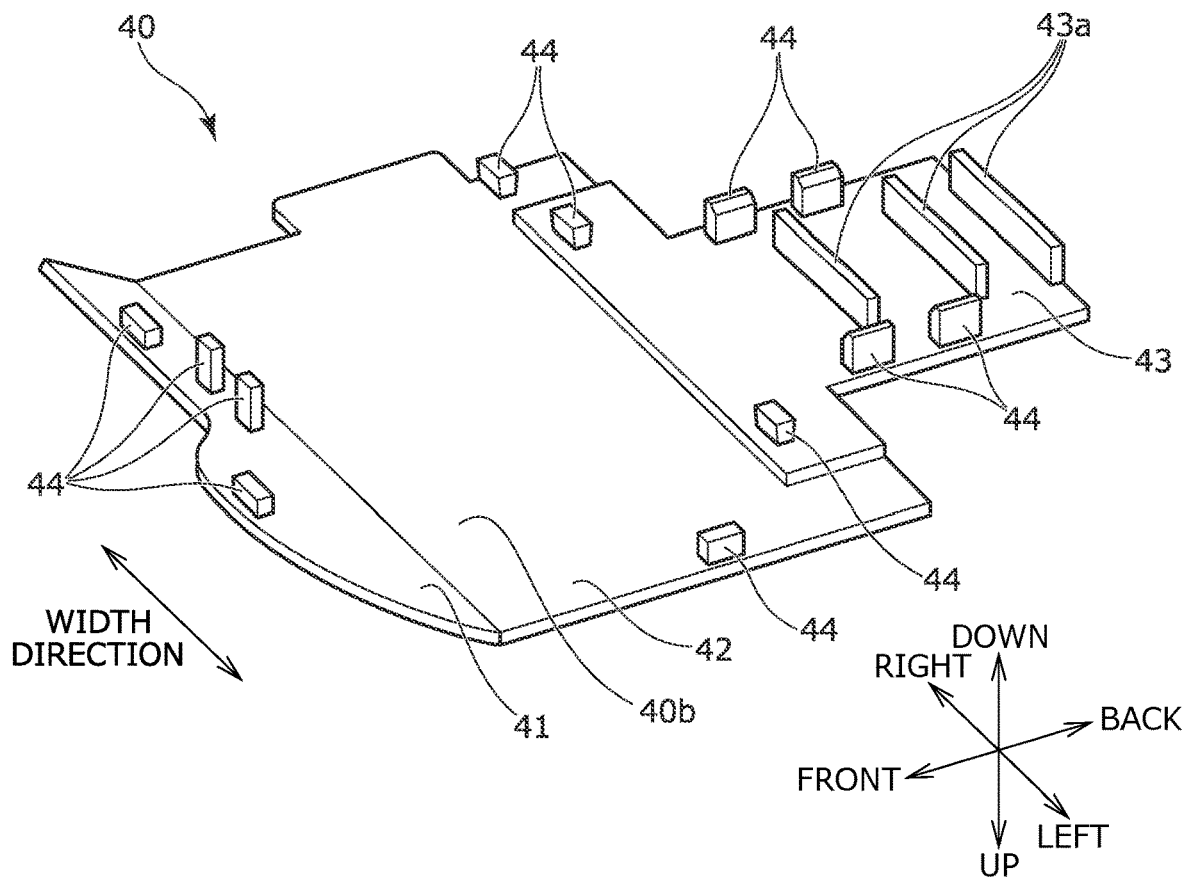
FIG. 11 is a back view of the cover member provided in the motorcycle seat according to one embodiment of the present invention.
Figure 12:
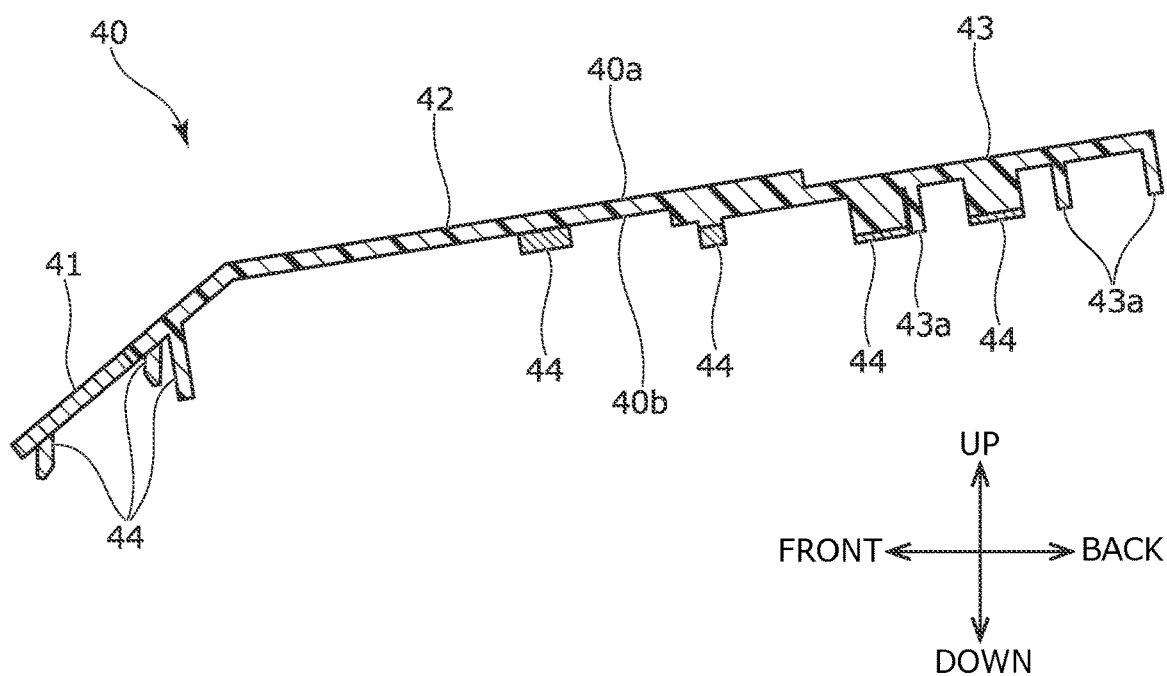
FIG. 12 is a cross-sectional view corresponding to an A-A cross section of the cover member in FIG. 6 provided in the motorcycle seat according to one embodiment of the present invention.

As illustrated in FIG. 6, the motorcycle seat S of the present embodiment includes a cover member 40 attached to the front surface 13 (upper surface) of the seat bottom plate 1. The cover member 40 can be made of, for example, a resin material, and may transmit light such that the inside of the accommodating recessed portion 15 can be visually recognized. As illustrated in FIGS. 10 to 12, the cover member 40 has a front surface 40a and a back surface 40b, and includes an inclined cover portion 41 corresponding to the inclined portion 11, a main cover portion 42 corresponding to the accommodating recessed portion 15, and a passage cover portion 43 corresponding to the passage portion 16 in order from the front.

As illustrated in FIGS. 10 and 11, the passage cover portion 43 of the cover member 40 includes a plurality of second protruding portions 43a protruding downward from the back surface 40b of the cover member 40 and extending in the seat width direction.

The cover member 40 is disposed to cover upper sides of electrical components (the air supply pump 21 and the valve unit 22) accommodated in the accommodating recessed portion 15 of the seat bottom plate 1. A plurality of the engaging protrusion portions 44 are formed in the back surface 40b, and the engaging protrusion portions 44 engage with the engaging recessed portions 13a provided in the front surface 13 of the seat bottom plate 1, so that the cover member 40 is fixed to the seat bottom plate 1. Upper sides of the electrical components accommodated in the accommodating recessed portion 15 are covered with the cover member 40, so that the electrical components are protected from a load from above caused by an occupant or the like.

As illustrated in FIGS. 6 and 13, the passage portion 16 of the seat bottom plate 1 is covered with the passage cover portion 43 of the cover member 40 from above, so that a ventilation path K through which outside air is to be ventilated is formed. In such a manner, since the seat bottom plate 1 and the cover member 40 form the ventilation path K communicating with the accommodating recessed portion 15 in which the electrical components are accommodated, the direct intrusion of water or dust into the accommodating recessed portion 15 is suppressed.

Figure 14:
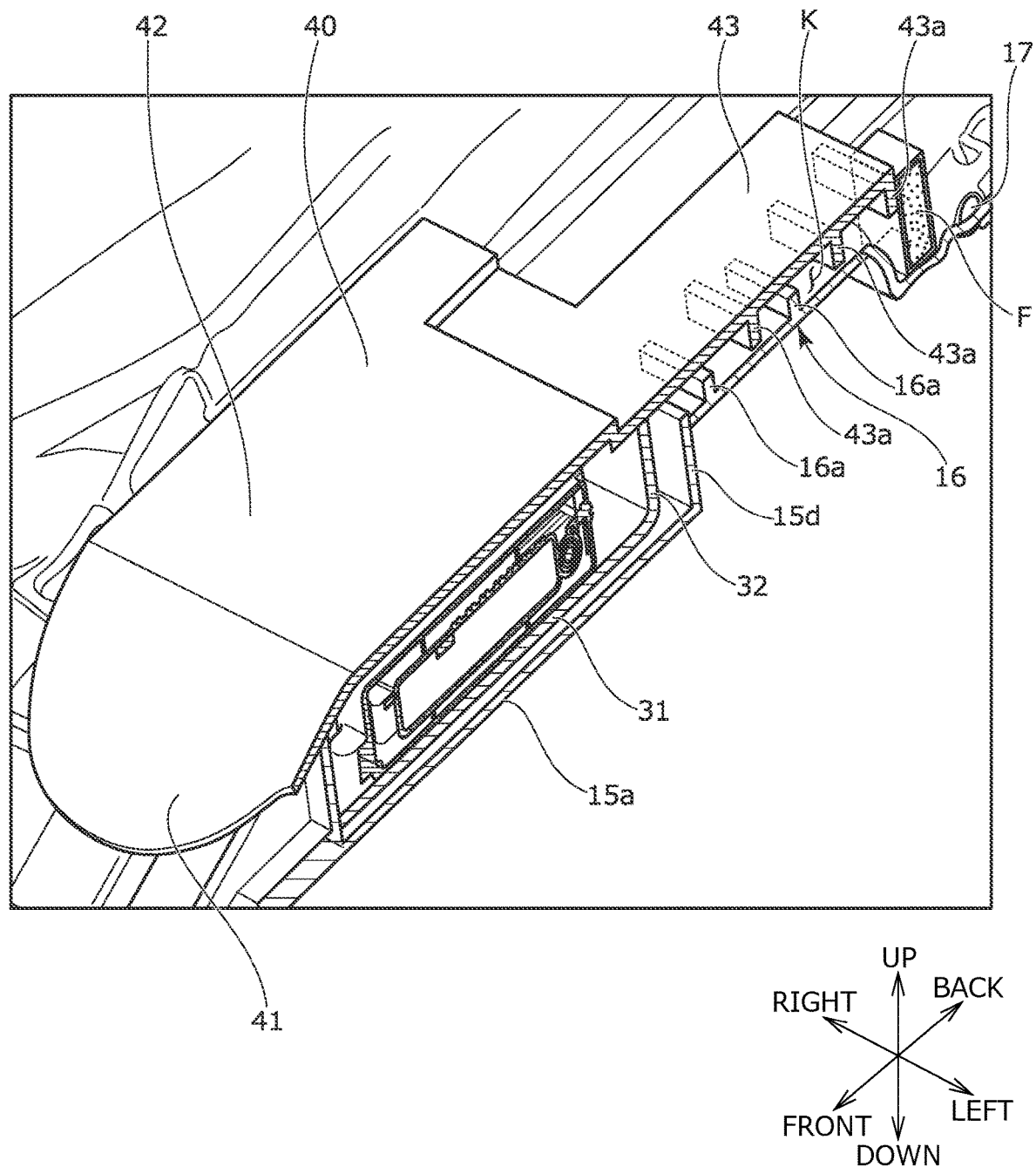
FIG. 14 is a schematic perspective view corresponding to the A-A cross section in FIG. 6.

In more detail, as illustrated in FIGS. 13 and 14, the first protruding portions 16a provided in the passage portion 16 and the second protruding portions 43a provided in the passage cover portion 43 are alternately disposed in a seat front to back direction to form the ventilation path K. Namely, since the ventilation path K has a labyrinth structure formed of the first protruding portions 16a and the second protruding portions 43a that are alternately disposed in the seat front to back direction, the intrusion of water or dust into the accommodating recessed portion 15 is even further suppressed.

In addition, a filter F made of a non-woven fabric or porous polyurethane is disposed in a rear end portion of the ventilation path K, and the intrusion of water or dust from the ventilation path K into the accommodating recessed portion 15 is suppressed.

(Suppression of Vibrations Input to Electrical Component)

As illustrated in FIGS. 13 and 14, the leg portion 33a of the first cushioning member 33 is disposed between the bottom surface 15a of the accommodating recessed portion 15 and the base portion 31 of the attachment bracket 30, and absorbs vibrations input to the electrical components (the air supply pump 21 and the valve unit 22) in the up to down direction. In addition, the second cushioning member 34 is disposed between the rear wall 15d of the accommodating recessed portion 15 and the erect portion 32 of the attachment bracket 30, and absorbs vibrations input to the electrical components (the air supply pump 21 and the valve unit 22) in the front to back direction. Namely, vibrations input to the electrical components both in a seat up to down direction and in the seat front to back direction are efficiently dampened.

As described above, in the motorcycle seat S of the present embodiment, since the electrical components are accommodated in the accommodating recessed portion 15 that is recessed downward, and are fixed to the accommodating recessed portion 15 via the first cushioning members 33 or the second cushioning members 34, an influence of vibrations or an external environment on the electrical components is suppressed without increasing the size of the seat.

In addition, in the accommodating recessed portion 15, the electrical components are attached onto the attachment bracket 30 including the base portion 31 disposed parallel to the bottom surface 15a of the accommodating recessed portion 15, and the erect portion 32 that is erected upward with respect to the base portion 31, and are held in a stable posture.

In addition, the first cushioning members 33 are disposed in the vicinities of corners 31d in the base portion 31 of the attachment bracket 30, so that up to down vibrations input to the electrical components disposed on the attachment bracket 30 are more efficiently dispersed and dampened (FIG. 8).

In addition, each of the second cushioning members 34 is disposed to interpose the erect portion 32 of the attachment bracket 30, so that front to back vibrations input to the electrical components disposed on the attachment bracket 30 are further efficiently dampened (FIGS. 8 and 13).

In addition, the accommodating recessed portion 15 is provided between the mounting members 14a in the seat width direction, the mounting members 14a being provided on the back surface 14 of the seat bottom plate 1, and the attachment bracket 30, the first cushioning members 33, and the second cushioning members 34 are disposed inside the mounting members 14a (FIG. 4). According to such a configuration, vibrations input from the vehicle body B to the motorcycle seat S via the mounting members 14a are appropriately dampened, so that vibrations input to the electrical components are further dampened.

In addition, the hardness (for example, Shore C hardness=30) of the second cushioning member 34 is set lower than the hardness (for example, Shore C hardness=50) of the mounting member 14a, so that vibrations input to the electrical components are further dampened while good ride quality of the motorcycle seat S is maintained.

Modification Examples

The configuration of the motorcycle seat S according to one embodiment of the present invention has been described above, but the embodiment is merely one example to facilitate understanding of the present invention, and does not limit the present invention. Namely, the present invention can be changed or improved without departing from the concept thereof, and it goes without saying that the present invention includes equivalents thereof.

Particularly, the structure, material, shape, dimensions, and the like of each component forming the motorcycle seat S are not limited to the contents described in the embodiment, and can be arbitrarily designed without departing from the concept of the present invention.

In the embodiment, the air supply pump 21 and the valve unit 22 provided in the fluid supply device 20 have been described as examples of an electrical component; however, the electrical component is not particularly limited as long as including a built-in electronic circuit.

In addition, an air blower pump (electrical component) (not illustrated) can be disposed laterally adjacent to the valve unit 22 inside the accommodating recessed portion 15.

In the embodiment, four first cushioning members 33 are disposed in the seat width direction, but only two first cushioning members 33 may be disposed in the vicinities of the corners 31d of the base portion 31 of the attachment bracket 30.

In the embodiment, the cover member 40 that covers electrical components from above is fixed to the seat bottom plate 1 by the engaging protrusion portions 44 (claws made of resin), but may be fixed by tapping or the like. In addition, a groove portion may be provided in the seat bottom plate 1, and a method may be adopted in which the cover member 40 and the seat bottom plate 1 are fixed to each other by inserting an outer peripheral end portion of the cover member 40 into the groove portion. At this time, waterproof and dustproof measures may be taken by affixing a cushion material or the like to the vicinity of a fitting portion between the seat bottom plate 1 and the outer peripheral end portion of the cover member 40.

In the embodiment, the ventilation path K is formed rearward from the accommodating recessed portion 15, but the ventilation path K can be formed forward from the accommodating recessed portion 15, or the ventilation path K can be formed sideways from the accommodating recessed portion 15.

In the embodiment, the filter F is installed in the rear end portion of the ventilation path K, but the filter may be installed in a front end portion of the ventilation path K, or the filters F may be installed in both the front end portion and the rear end portion of the ventilation path K.

(Motorcycle Seat SX According to Modification Example)

Hereinafter, regarding a motorcycle seat SX according to a modification example, a description of the same points as those of the motorcycle seat S will be omitted, and different points will be mainly described with reference to FIGS. 15 to 21.

(Attachment Bracket 30X)

Figure 15:
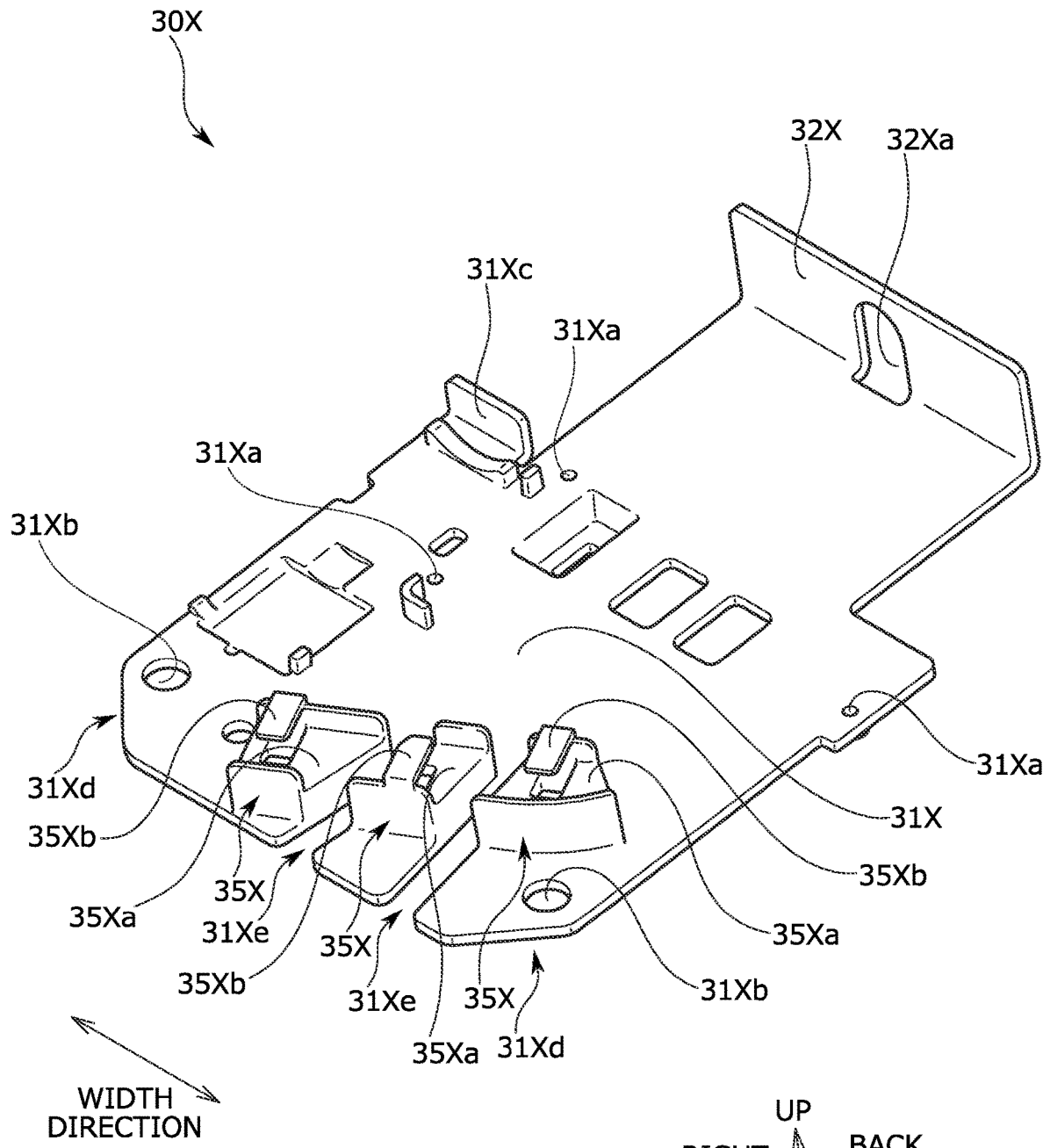
FIG. 15 is a perspective view of an attachment bracket provided in a motorcycle seat according to a modification example.

FIG. 15 is a perspective view of an attachment bracket 30X provided in the motorcycle seat SX according to a modification example. As illustrated in FIG. 15, the attachment bracket 30X includes a base portion 31X to be disposed parallel to the bottom surface 15a of the accommodating recessed portion 15, and an erect portion 32X that is erected upward with respect to the base portion 31X.

Fixing holes 31Xa for fixing the valve unit 22, first attachment holes 31Xb for attaching the first cushioning members 33, and a protective portion 31Xc that protects the rear of the air supply pump 21 are formed in the base portion 31X. The first attachment hole 31Xb is formed in the vicinity of each of corners 31Xd of the base portion 31X. In addition, the corner 31d of the base portion 31X has an inclined shape such that the base portion 31X is reduced in width as extending from the rear toward the front.

A second attachment hole 32Xa for attaching the second cushioning member 34 is formed in the erect portion 32X. Two slits 31Xe that are cut out rearward from a front end of the base portion 31X are formed at the front of the base portion 31X. As will be described later, the two slits 31Xe are formed to correspond to the two cutouts 15g through which the fluid supply tubes 24 pass.

Three fastening portions 35X that fix the connection pipe 23 connecting the air supply pump 21 and the valve unit 22 are formed outside of the two slits 31Xe in the seat width direction. The fastening portion 35X includes a support portion 35Xa protruding upward from the base portion 31X, and a locking piece 35Xb that holds down the connection pipe 23 from above, the connection pipe 23 being supported by the support portion 35Xa.

Figure 16:
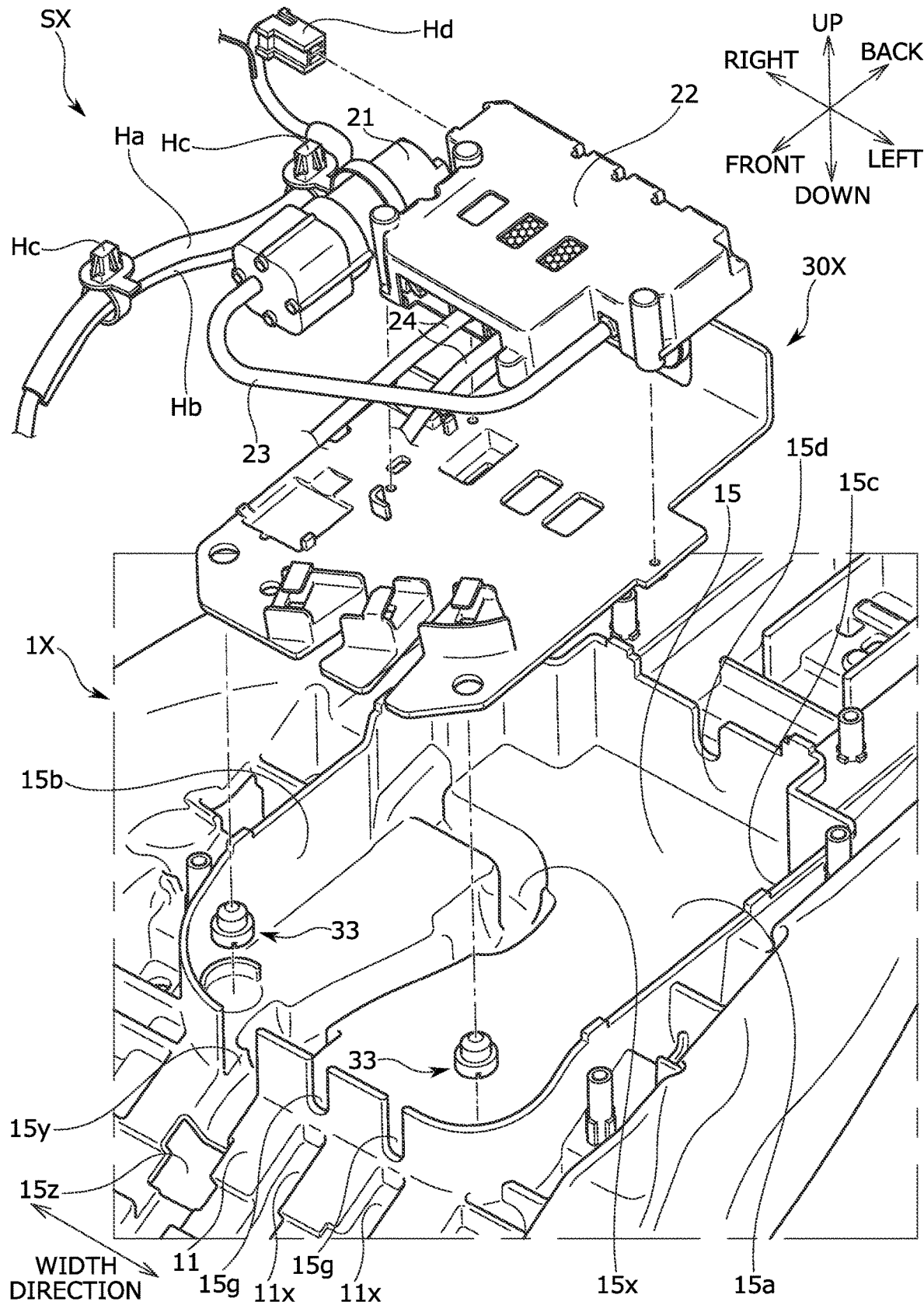
FIG. 16 is an exploded perspective view of the motorcycle seat according to a modification example.
Figure 17:
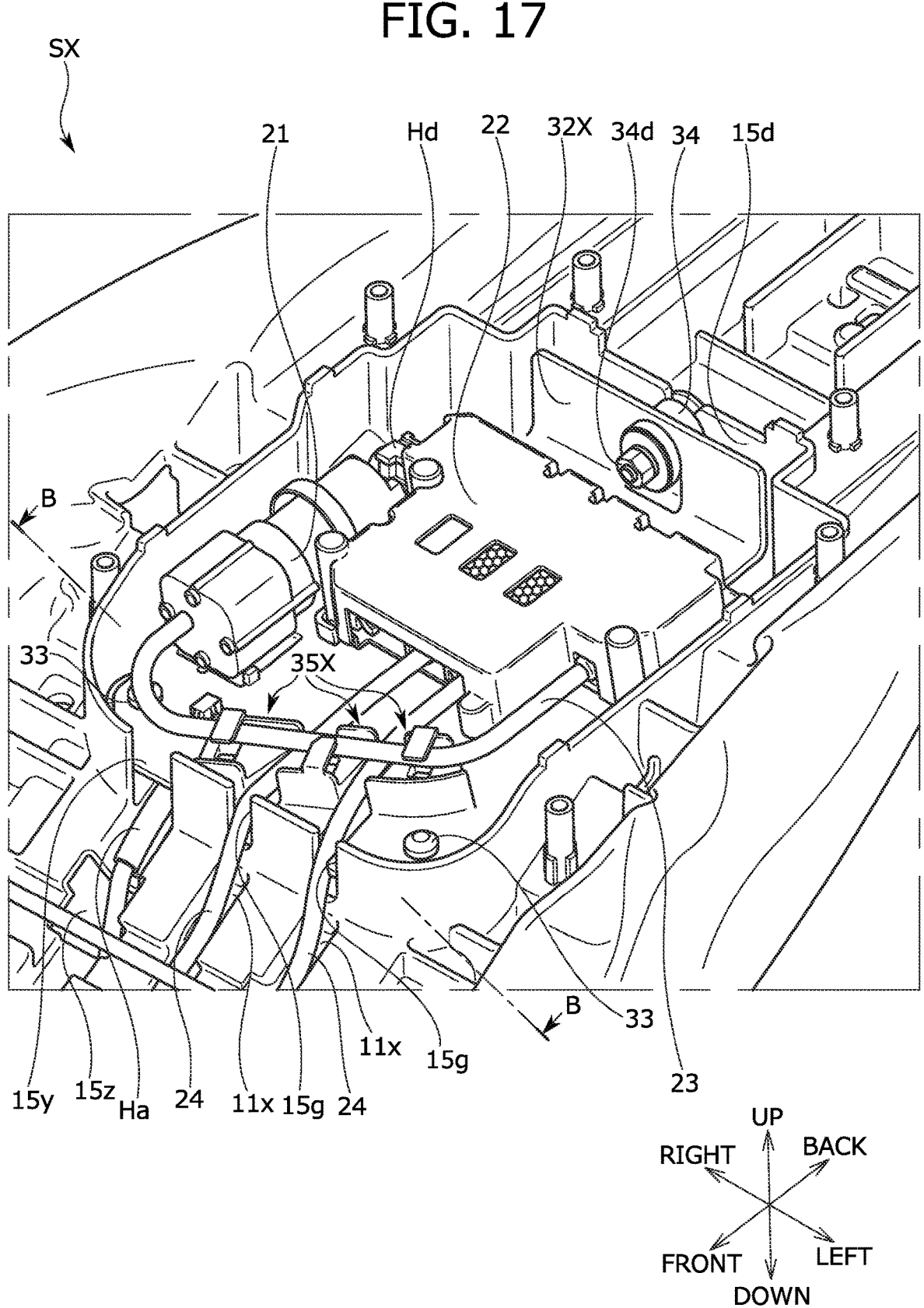
FIG. 17 is a perspective view illustrating a state where an air supply pump and a valve unit placed on the attachment bracket are disposed in an accommodating recessed portion of a seat bottom plate of the motorcycle seat according to a modification example.
Figure 18:
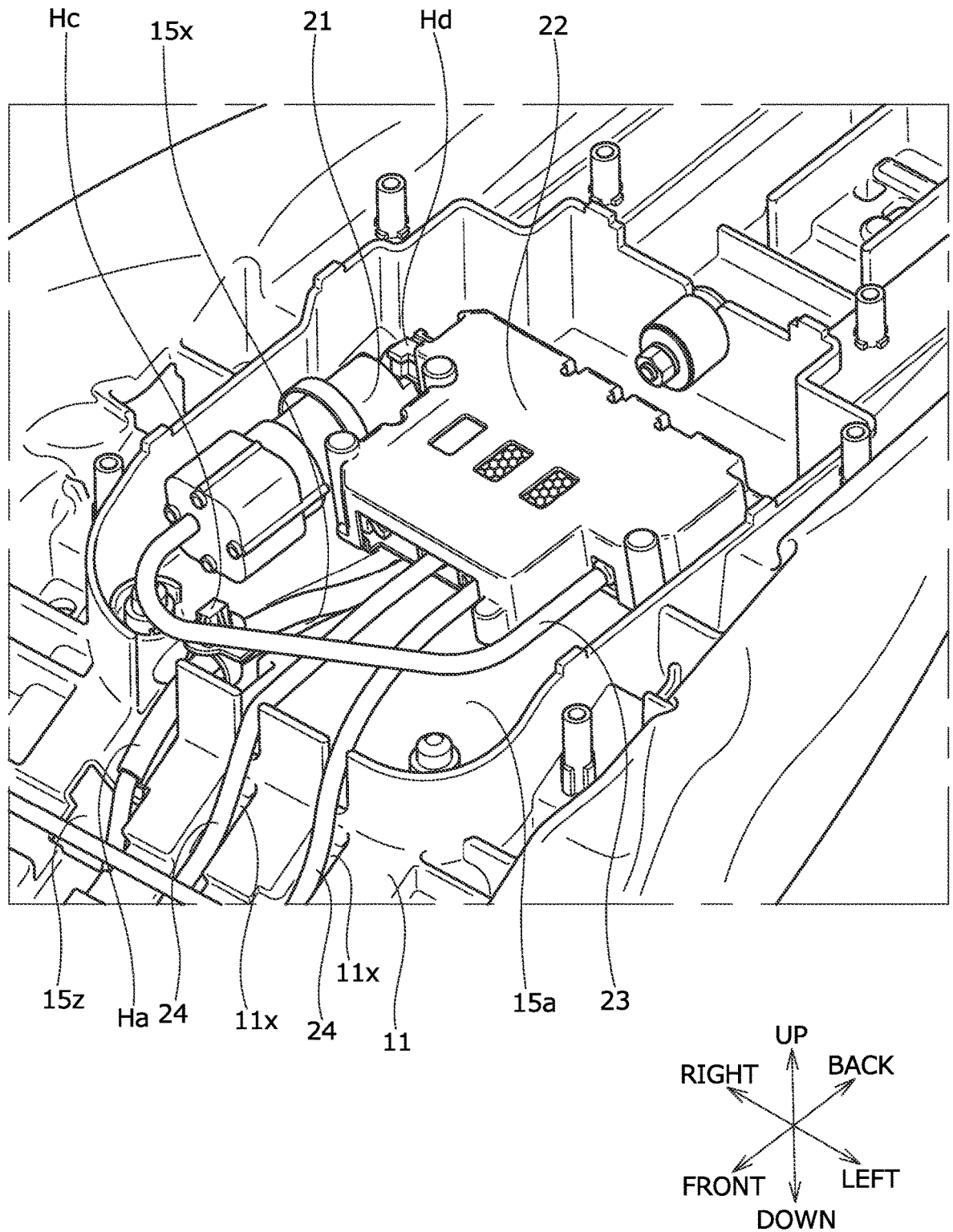
FIG. 18 is a perspective view illustrating a state where the air supply pump and the valve unit are disposed in the accommodating recessed portion of the seat bottom plate of the motorcycle seat according to a modification example.

FIG. 16 is an exploded perspective view of the motorcycle seat SX, and FIG. 17 is a perspective view illustrating a state where the air supply pump 21 and the valve unit 22 placed on the attachment bracket 30X are disposed in the accommodating recessed portion 15 of a seat bottom plate 1X of the motorcycle seat SX. FIG. 18 is a perspective view illustrating a state where the air supply pump 21 and the valve unit 22 are disposed in the accommodating recessed portion 15, and the attachment bracket 30X is not illustrated.

As illustrated in FIG. 16, a first harness Ha and a second harness Hb are bundled by a binding member Hc, and are connected to the valve unit 22 via a connector Hd. A wiring passage 15x that is recessed downward from the bottom surface 15a is formed in the accommodating recessed portion 15 of the seat bottom plate 1X.

In addition, a cutout 15y is formed downward in the front wall 15e to correspond to the wiring passage 15x. The wiring passage 15x extends forward to the inclined portion 11 of the seat bottom plate 1X, and a drain hole 15z penetrating through the seat bottom plate 1X is formed at a front end of the wiring passage 15x.

As illustrated in FIGS. 17 and 18, the first harness Ha and the second harness Hb are disposed downward from the air supply pump 21 and the valve unit 22 along the wiring passage 15x below the attachment bracket 30X, pass through the drain hole 15z, and head toward the back surface 14 of the seat bottom plate 1X. Since the wiring passage 15x is provided in such a manner, the misalignment of the first harness Ha and the second harness Hb or the application of an external force thereto is suppressed.

In addition, as illustrated in FIGS. 17 and 18, the connection pipe 23 is supported by the support portions 35Xa from below and is held down by the locking pieces 35Xb from above in the three fastening portions 35X, so that the connection pipe 23 is fixed in the accommodating recessed portion 15.

The air supply pump 21 partly overlaps the valve unit 22 in the front to back direction, and is more compactly disposed in the seat width direction than in the above-described embodiment. The connection pipe 23 passes through the front of the accommodating recessed portion 15, and is connected to the valve unit 22 in the rear, but since the three fastening portions 35X are disposed to be offset from each other from the front to the rear, the connection pipe 23 is prevented from being sharply bent and crushed.

In addition, as illustrated in FIG. 17, since the two slits 31Xe of the attachment bracket 30X are disposed to correspond to the two cutouts 15g formed in the front wall 15e of the accommodating recessed portion 15, two fluid supply tubes 24 pass below the connection pipe 23 and thus, are prevented from interfering with each other.

Figure 19:
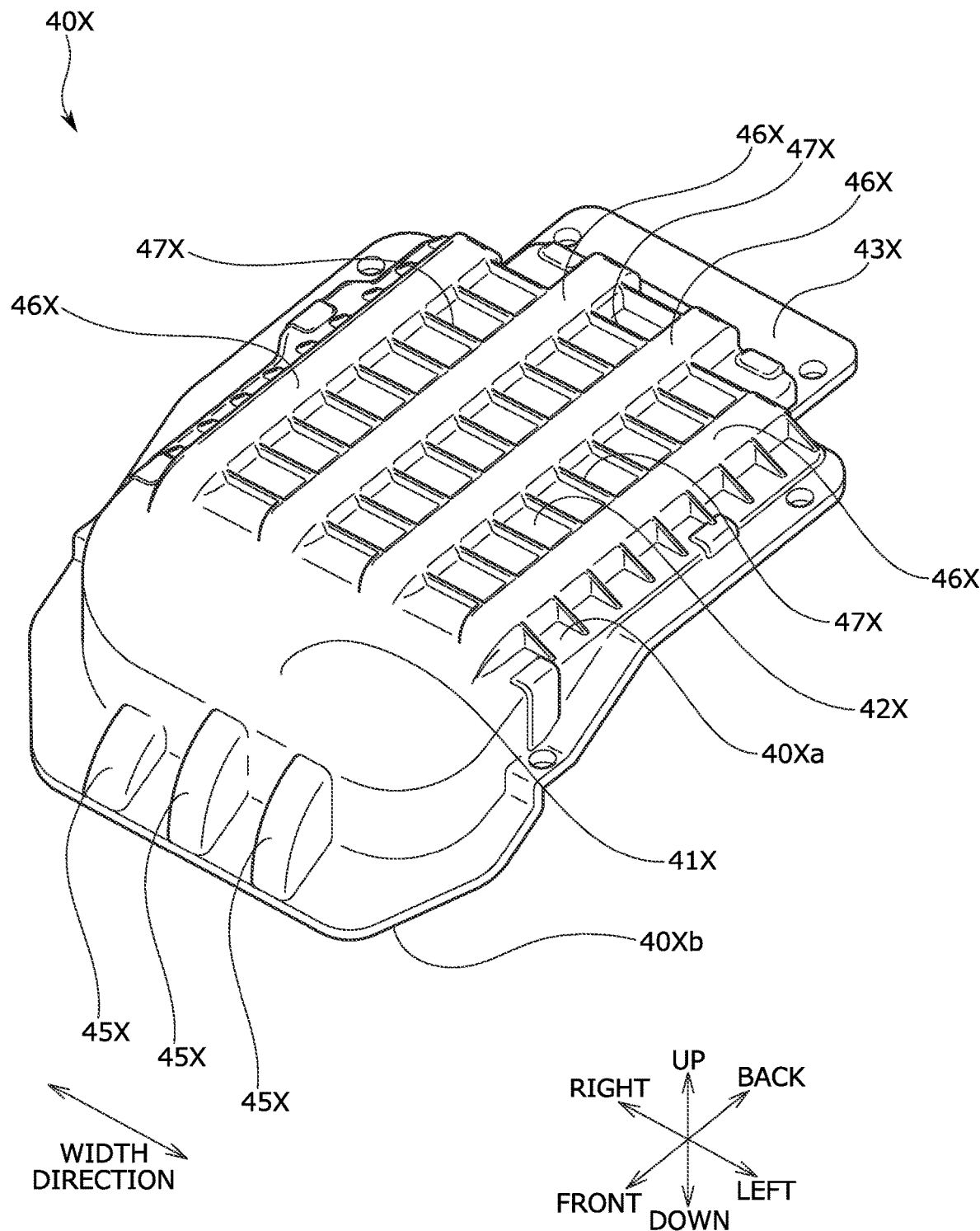
FIG. 19 is a perspective view of a cover member provided in the motorcycle seat according to a modification example.
Figure 21:
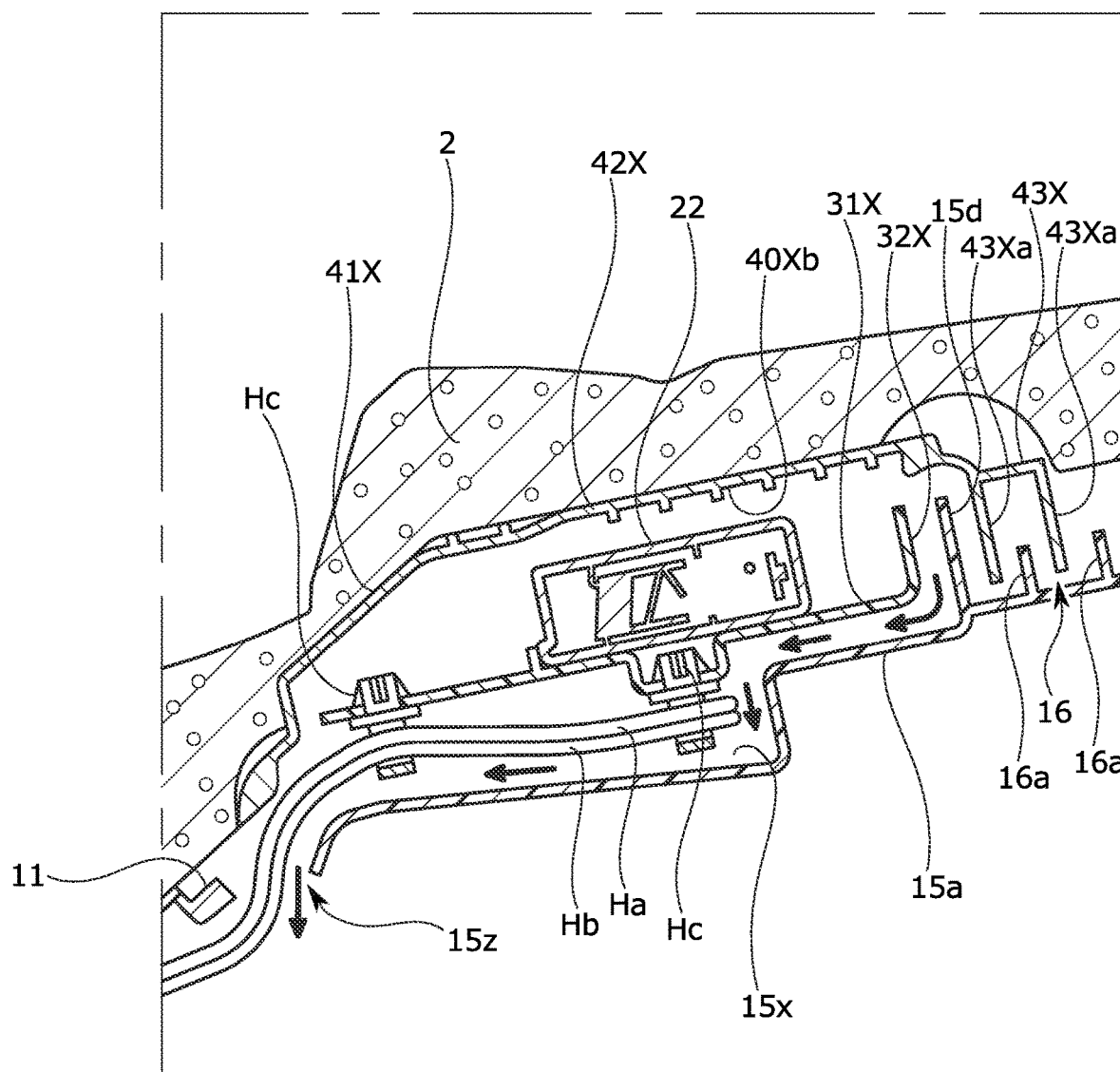
FIG. 21 is a cross-sectional view taken along line C-C in FIG. 20.
Figure 21:
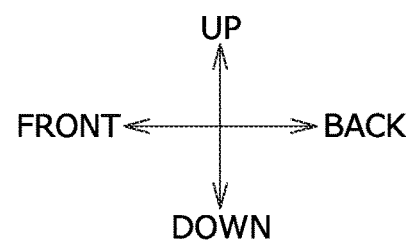

FIG. 19 illustrates a perspective view of a cover member 40X provided in the motorcycle seat SX according to a modification example. The cover member 40X has a front surface 40Xa and a back surface 40Xb, and includes an inclined cover portion 41X, a main cover portion 42X, and a passage cover portion 43X in order from the front. As illustrated in FIG. 21 to be described later, the passage cover portion 43X includes a plurality of second protruding portions 43Xa protruding downward from the back surface 40Xb of the cover member 40X and extending in the seat width direction.

The cover member 40X includes a plurality of beads 46X protruding upward from the front surface 40Xa and extending in the front to back direction, and a plurality of ribs 47X provided between the plurality of beads 46X adjacent to each other. Each of the ribs 47X extends in the seat width direction, and the plurality of ribs 47X arranged side by side in the front to back direction. Since the beads 46X and the ribs 47 are formed, the strength of the cover member 40X is improved.

In addition, the cover member 40X includes three bulged portions 45X protruding forward at positions corresponding to the two fluid supply tubes 24 and the first harness Ha (second harness Hb) that are disposed in the inclined portion 11 of the seat bottom plate 1X. The fluid supply tubes 24 or the first harness Ha (second harness Hb) is appropriately protected by the bulged portions 45X.

Figure 20:
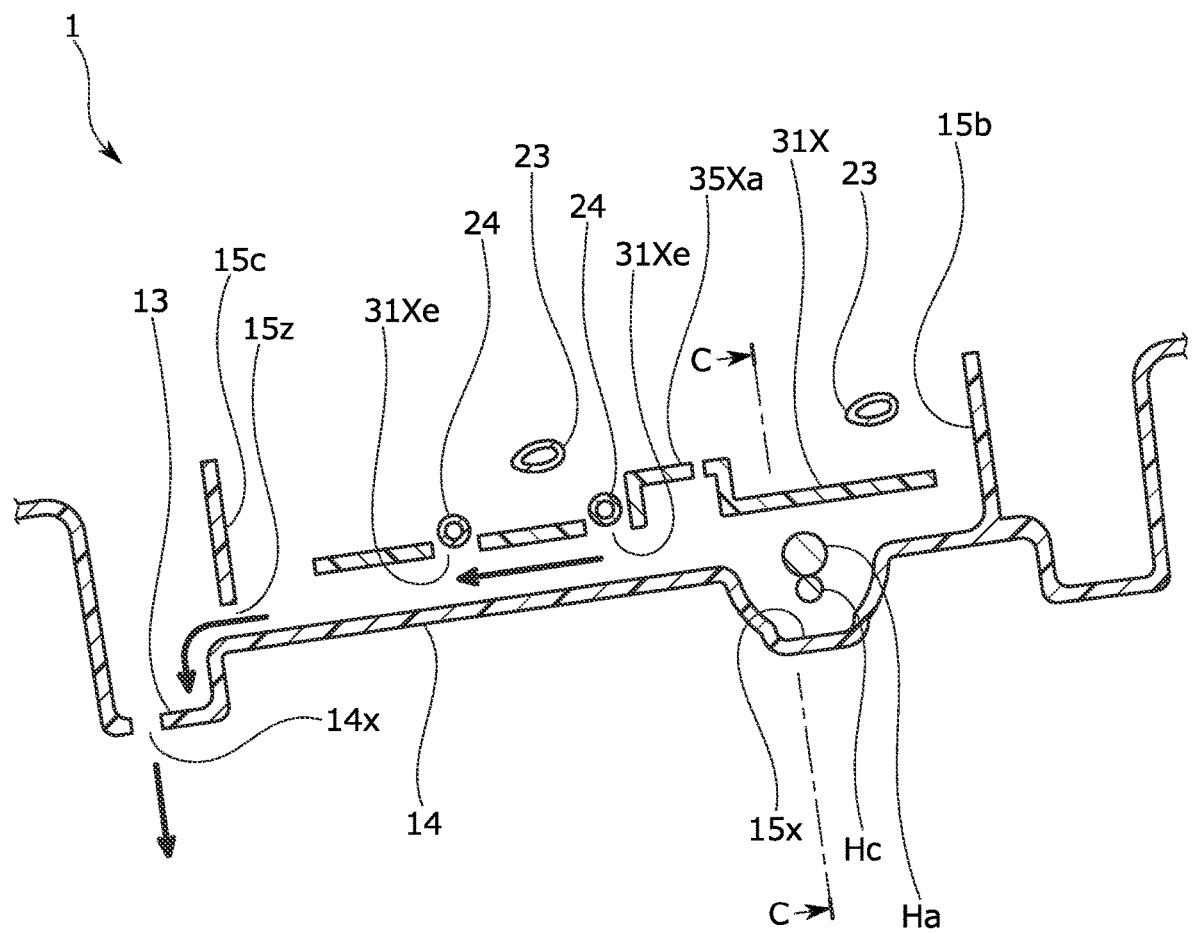
FIG. 20 is a cross-sectional view taken along line B-B in FIG. 17.
Figure 20:
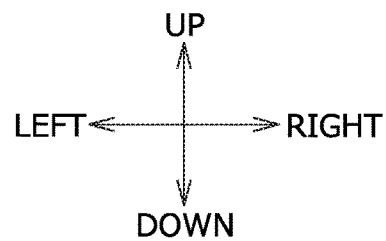

A drainage structure in the motorcycle seat SX will be described with reference to FIGS. 20 and 21. FIG. 20 is a cross-sectional view taken along line B-B in FIG. 17, and FIG. 21 is a cross-sectional view taken along line C-C in FIG. 20.

FIG. 20 illustrates a state of the motorcycle V at stop, and the vehicle body B and the motorcycle seat SX are inclined such that the left side in the seat width direction is lowered. Even when rain or the like enters the accommodating recessed portion 15 from the outside, the rain or the like passes through the drain hole 15z from a lower side of the base portion 31X of the attachment bracket 30X, and is drained via a drain hole 14x provided in a side portion of the seat bottom plate 1X, the drain hole 15z being provided at a lower end of the second side wall 15c.

FIG. 21 illustrates a state of the motorcycle V during traveling, and is inclined such that the front of the motorcycle seat SX is lowered. Even when rain or the like enters the accommodating recessed portion 15 from the outside, the rain or the like is drained from the lower side of the base portion 31X of the attachment bracket 30X via the drain hole 15z provided in the inclined portion 11 of the seat bottom plate 1X.

The straddle-type seat according to the present embodiment has been described above by taking a vehicle seat to be used mainly for two-wheeled vehicles as an example. The straddle-type seat according to the present embodiment is not limited to a vehicle seat for two-wheeled vehicles, and is applicable to, for example, seats for snowmobiles, water scooters, three-wheeled buggy vehicles, or construction machines.

REFERENCE SIGNS LIST

V: motorcycle
B: vehicle body
S, SX: motorcycle seat (straddle-type seat)
S1: front seating portion
S2: rear seating portion
S3: non-seating portion
1, 1X: seat bottom plate
2: cushion pad
3: skin material
10: front portion
11: inclined portion
   11x: groove portion
12: rear portion
13: front surface
   13a: engaging recessed portion
14: back surface
   14a: mounting member
   14b: striker
   14x: drain hole
15: accommodating recessed portion
   15a: bottom surface
   15b: first side wall
   15c: second side wall
   15d: rear wall
   15e: front wall
   15f: protruding portion
   15g: cutout
   15x: wiring passage
   15y: cutout
   15z: drain hole
16: passage portion
   16a: first protruding portion
17: ventilation portion
20: fluid supply device
21: air supply pump (electrical component)
22: valve unit (electrical component)
23: connection pipe
24: fluid supply tube
25: air cell
30: attachment bracket
31: base portion
   31a: fixing hole
   31b: first attachment hole
   31c: protective portion
   31d: corner
32: erect portion
   32a: second attachment hole
33: first cushioning member
   33a: leg portion
   33b: protrusion portion
34: second cushioning member
   34a: main body
   34b: through hole
   34c: groove portion
   34d: bolt
40: cover member
   40a: front surface
   40b: back surface
41: inclined cover portion
42: main cover portion
43: passage cover portion
   43a: second protruding portion
44: engaging protrusion portion
F: filter
K: ventilation path
30X: attachment bracket
31X: base portion
   31Xa: fixing hole
   31Xb: first attachment hole
   31Xc: protective portion
   31Xd: corner
   31Xe: slit
32X: erect portion
   32Xa: second attachment hole
35X: fastening portion
   35Xa: support portion
   35Xb: locking piece
40X: cover member
   40Xa: front surface
   40Xb: back surface
41X: inclined cover portion
42X: main cover portion
43X: passage cover portion
   43Xa: second protruding portion
45X: bulged portion
46X: bead
47X: rib
Ha: first harness
Hb: second harness
Hc: binding member
Hd: connector

The invention claimed is:

1. A straddle-type seat on which a seated occupant is to be seated in a straddling state, the seat comprising:
a seat bottom plate including an accommodating recessed portion that is recessed downward; and
an electrical component accommodated in the accommodating recessed portion,
wherein the electrical component is fixed in the accommodating recessed portion via a cushioning member,
wherein the electrical component is attached onto an attachment bracket in the accommodating recessed portion,
the attachment bracket includes a base portion disposed parallel to a bottom surface of the accommodating recessed portion, and an erect portion that is erected upward with respect to the base portion,
wherein the accommodating recessed portion includes the bottom surface and a rear wall orthogonal to the bottom surface at a rear end of the bottom surface, and
the cushioning member includes a first cushioning member to be disposed between the bottom surface and the base portion, and a second cushioning member to be disposed between the rear wall and the erect portion.

2. The straddle-type seat according to claim 1, wherein the first cushioning member is disposed at a corner in the base portion of the attachment bracket.

3. The straddle-type seat according to claim 1,
wherein the second cushioning member is disposed to interpose the erect portion.

4. The straddle-type seat according to claim 1,
wherein a back surface of the seat bottom plate is provided with a plurality of mounting members that abut a vehicle body when the straddle-type seat is attached to the vehicle body, and
the attachment bracket, the first cushioning member, and the second cushioning member are disposed inside the plurality of mounting members in a width direction of the straddle-type seat.

5. The straddle-type seat according to claim 4,
wherein a hardness of the second cushioning member is lower than a hardness of the mounting member.

6. The straddle-type seat according to claim 1, further comprising:
a cover member attached to an upper surface of the seat bottom plate,
wherein the cover member is disposed to cover an upper side of the electrical component.

7. The straddle-type seat according to claim 6,
wherein the seat bottom plate includes a ventilation portion communicating with the accommodating recessed portion, and
the ventilation portion is covered with the cover member from above so that a ventilation path through which outside air is to be ventilated is formed.

8. The straddle-type seat according to claim 7,
wherein the ventilation portion of the seat bottom plate includes a plurality of first protruding portions protruding upward and extending in a width direction of the straddle-type seat,
the cover member includes a plurality of second protruding portions protruding downward from a back surface of the cover member and extending in the width direction of the straddle-type seat, and
the first protruding portions and the second protruding portions are alternately disposed in a front to back direction of the straddle-type seat to form the ventilation path.

9. A straddle-type seat on which a seated occupant is to be seated in a straddling state, the seat comprising:
a seat bottom plate including an accommodating recessed portion that is recessed downward;
an electrical component accommodated in the accommodating recessed portion; and
a cover member attached to an upper surface of the seat bottom plate,
wherein the electrical component is fixed in the accommodating recessed portion via a cushioning member,
wherein the cover member is disposed to cover an upper side of the electrical component,
wherein the seat bottom plate includes a ventilation portion communicating with the accommodating recessed portion, and
the ventilation portion is covered with the cover member from above so that a ventilation path through which outside air is to be ventilated is formed.

10. The straddle-type seat according to claim 9,
wherein the ventilation portion of the seat bottom plate includes a plurality of first protruding portions protruding upward and extending in a width direction of the straddle-type seat,
the cover member includes a plurality of second protruding portions protruding downward from a back surface of the cover member and extending in the width direction of the straddle-type seat, and
the first protruding portions and the second protruding portions are alternately disposed in a front to back direction of the straddle-type seat to form the ventilation path.

* * * * *